Aug. 30, 1960 L. V. GEWISS 2,950,656
ARRANGEMENT FOR THE MECHANICAL AND CONTINUOUS
PRODUCTION OF DEVELOPABLE
HERRING-BONE STRUCTURES
Filed Jan. 15, 1959 26 Sheets-Sheet 2

INVENTOR
LUCIEN VICTOR GEWISS
By Linton and Linton
ATTORNEYS

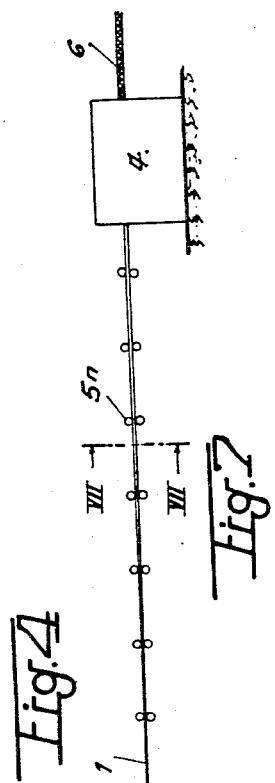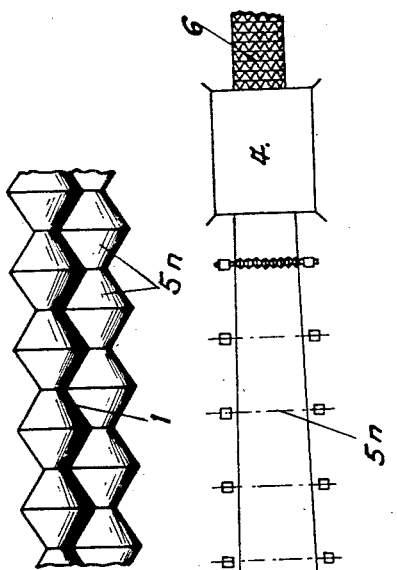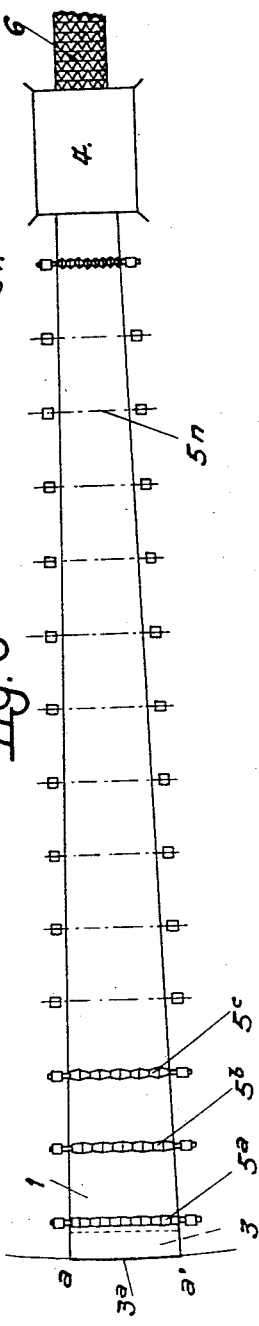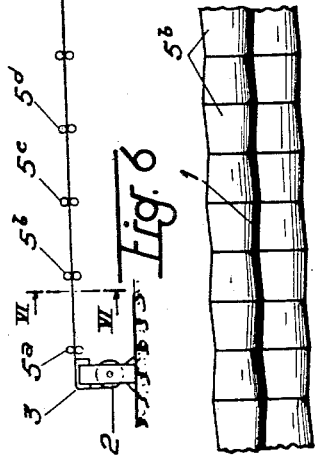

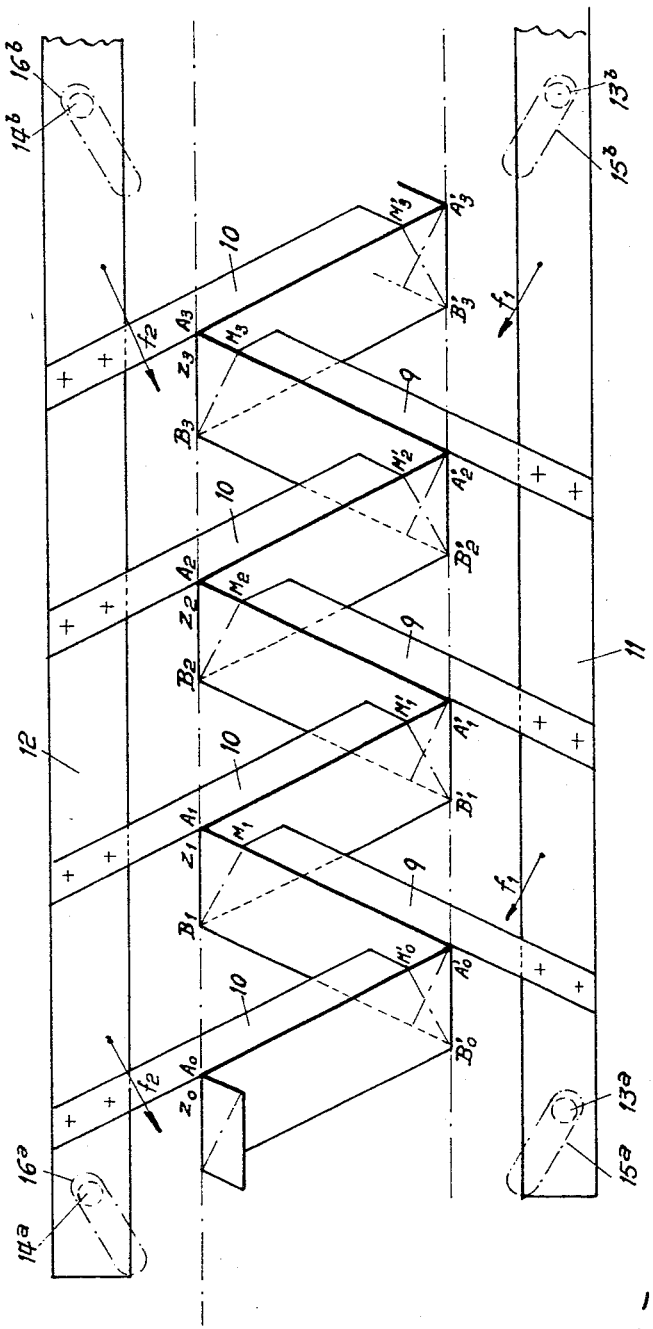

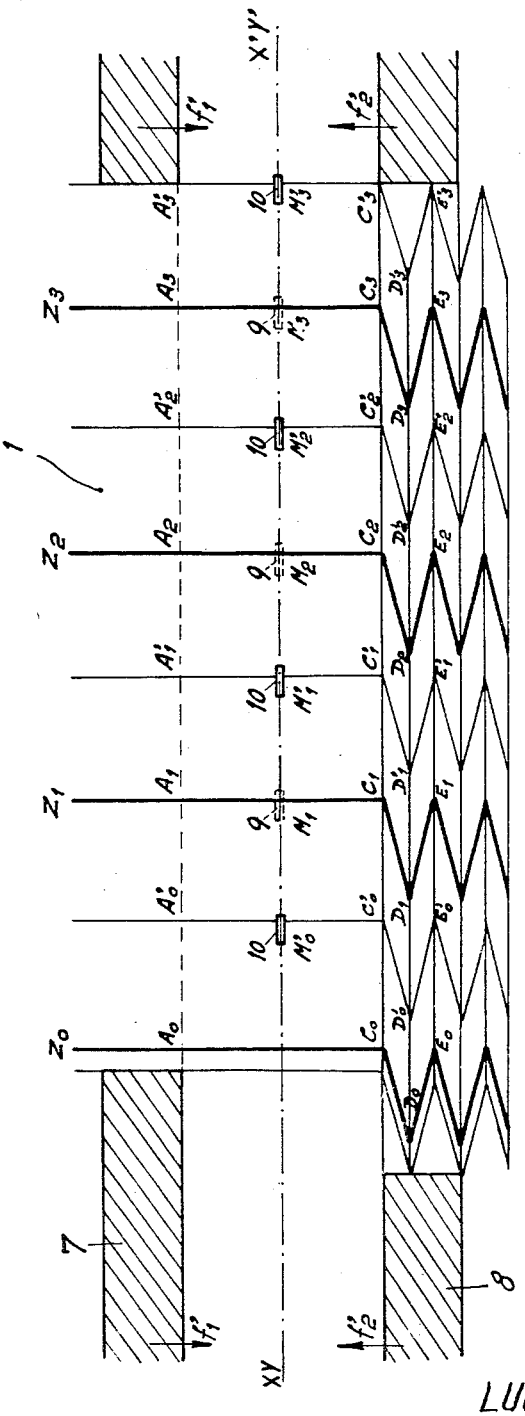

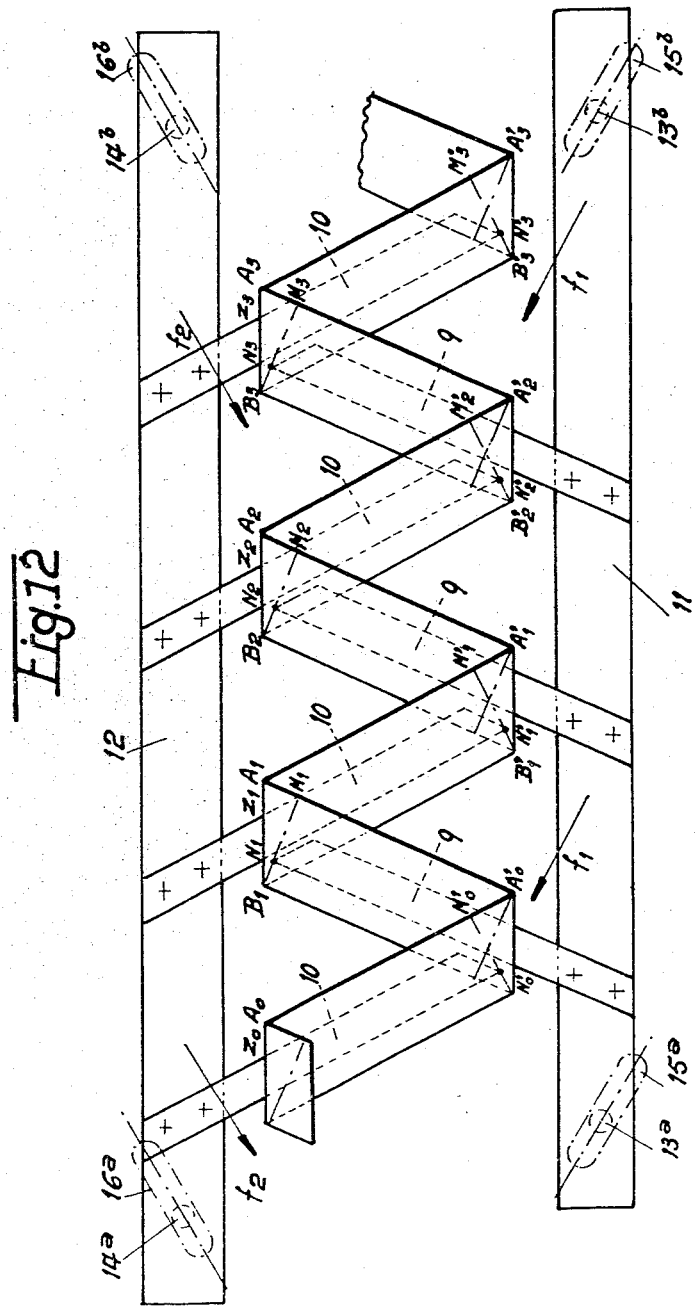

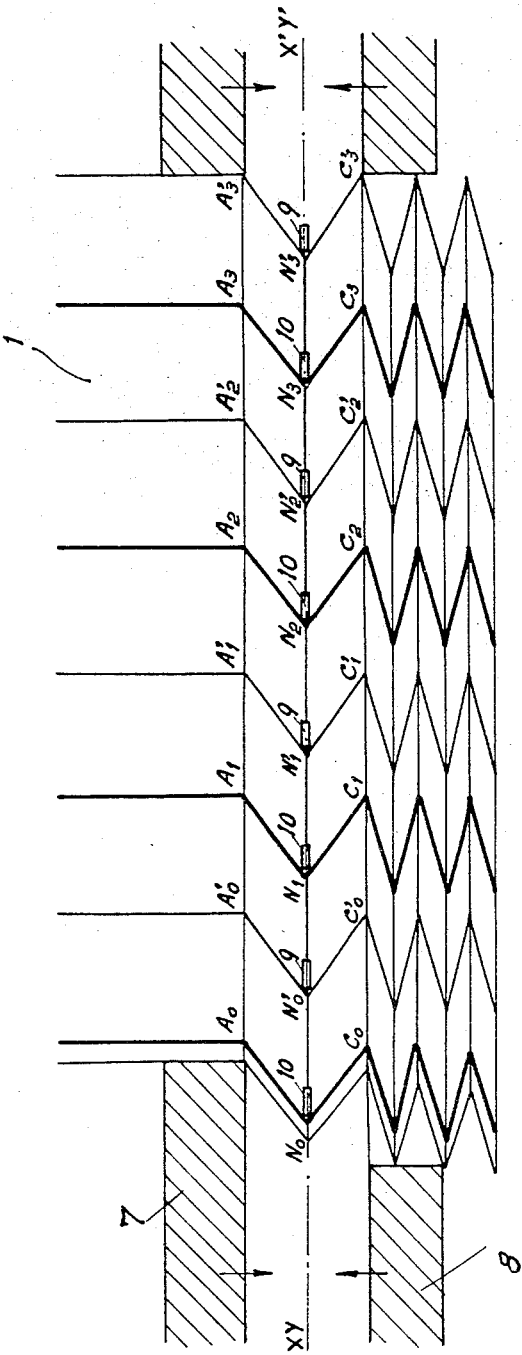

Aug. 30, 1960 L. V. GEWISS 2,950,656
ARRANGEMENT FOR THE MECHANICAL AND CONTINUOUS
PRODUCTION OF DEVELOPABLE
HERRING-BONE STRUCTURES
Filed Jan. 15, 1959 26 Sheets-Sheet 9
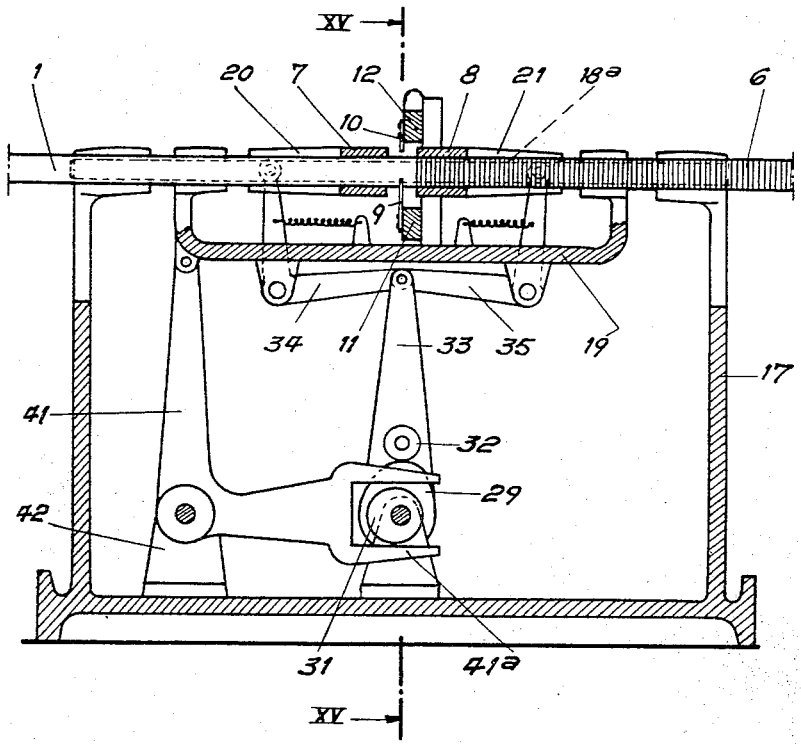
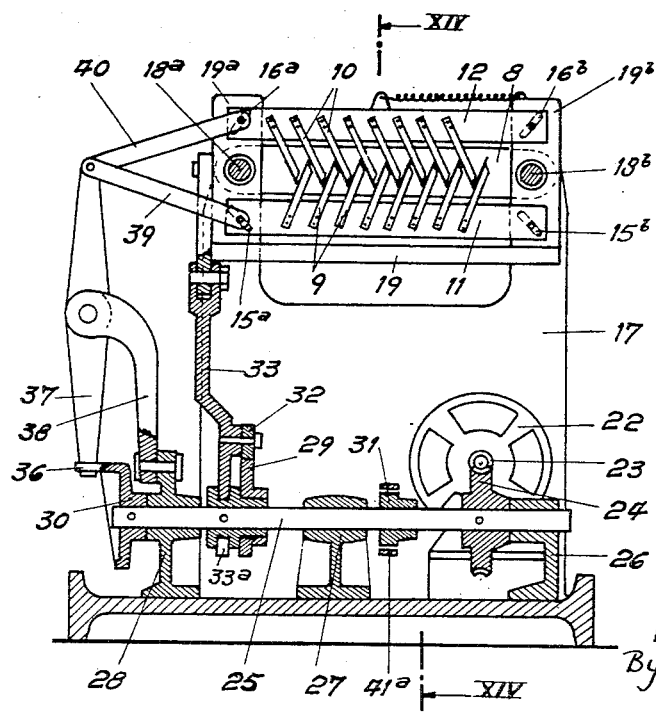
INVENTOR
LUCIEN VICTOR GEWISS Aug. 30, 1960 — L. V. GEWISS — 2,950,656
ARRANGEMENT FOR THE MECHANICAL AND CONTINUOUS
PRODUCTION OF DEVELOPABLE
HERRING-BONE STRUCTURES
Filed Jan. 15, 1959 — 26 Sheets-Sheet 10

INVENTOR
LUCIEN VICTOR GEWISS
By Linton and Linton
ATTORNEYS

Aug. 30, 1960 L. V. GEWISS 2,950,656
ARRANGEMENT FOR THE MECHANICAL AND CONTINUOUS
PRODUCTION OF DEVELOPABLE
HERRING-BONE STRUCTURES
Filed Jan. 15, 1959 26 Sheets-Sheet 11
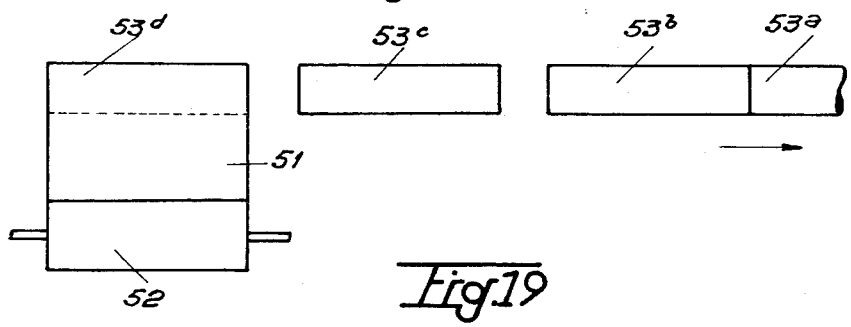
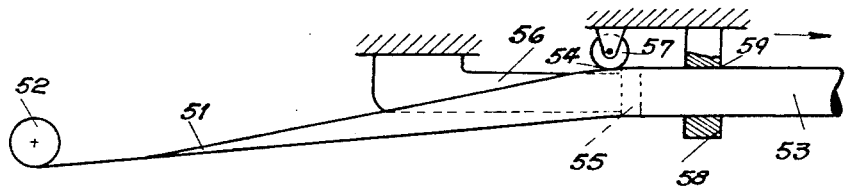
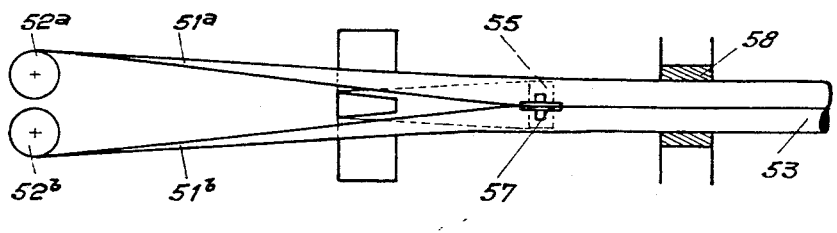
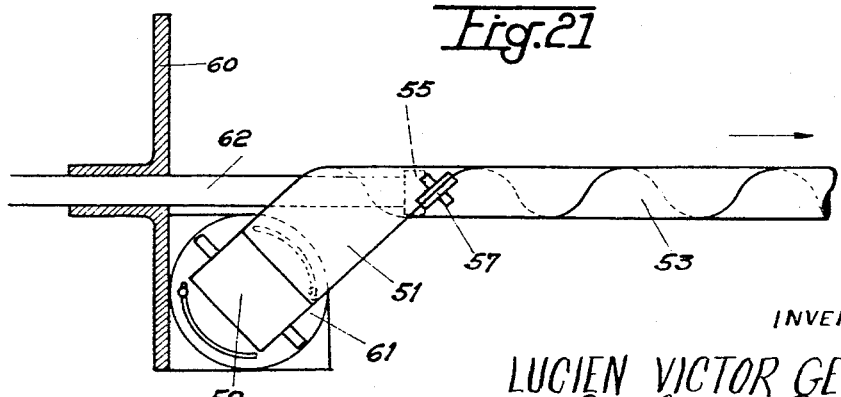
INVENTOR
LUCIEN VICTOR GEWISS
By Linton and Linton
ATTORNEYS Aug. 30, 1960

L. V. GEWISS 2,950,656

ARRANGEMENT FOR THE MECHANICAL AND CONTINUOUS
PRODUCTION OF DEVELOPABLE
HERRING-BONE STRUCTURES

Filed Jan. 15, 1959

INVENTOR
LUCIEN VICTOR GEWISS
By Linton and Linton
ATTORNEYS

Aug. 30, 1960 L. V. GEWISS 2,950,656
ARRANGEMENT FOR THE MECHANICAL AND CONTINUOUS
PRODUCTION OF DEVELOPABLE
HERRING-BONE STRUCTURES
Filed Jan. 15, 1959 26 Sheets-Sheet 14

INVENTOR
LUCIEN VICTOR GEWISS
By Linton and Linton
ATTORNEYS

Aug. 30, 1960     L. V. GEWISS     2,950,656
ARRANGEMENT FOR THE MECHANICAL AND CONTINUOUS
PRODUCTION OF DEVELOPABLE
HERRING-BONE STRUCTURES

Filed Jan. 15, 1959     26 Sheets-Sheet 15

INVENTOR
LUCIEN VICTOR GEWISS
By Linton and Linton
ATTORNEYS

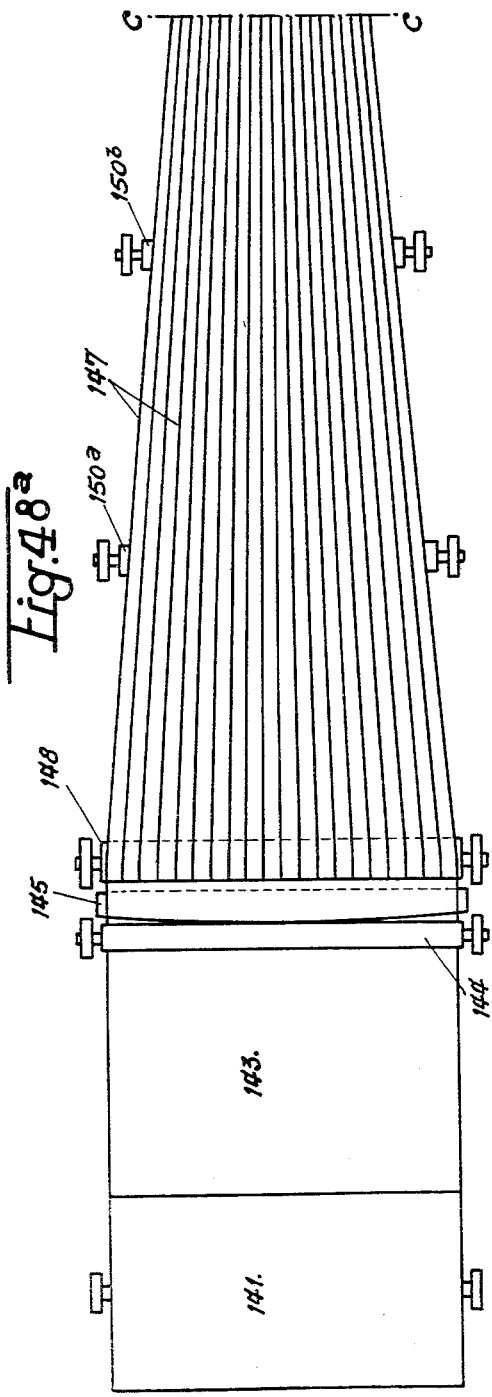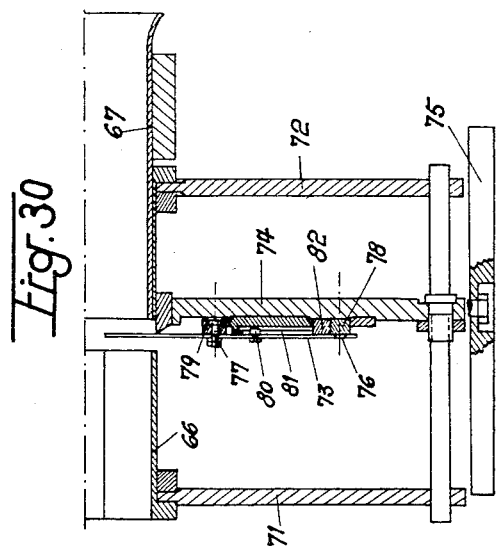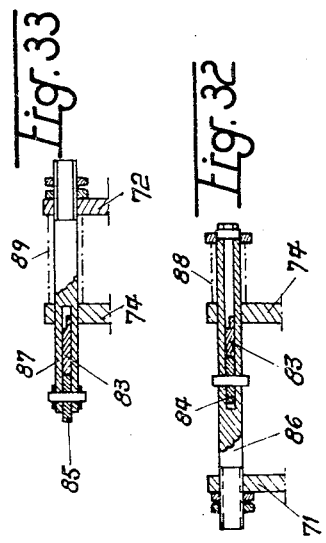

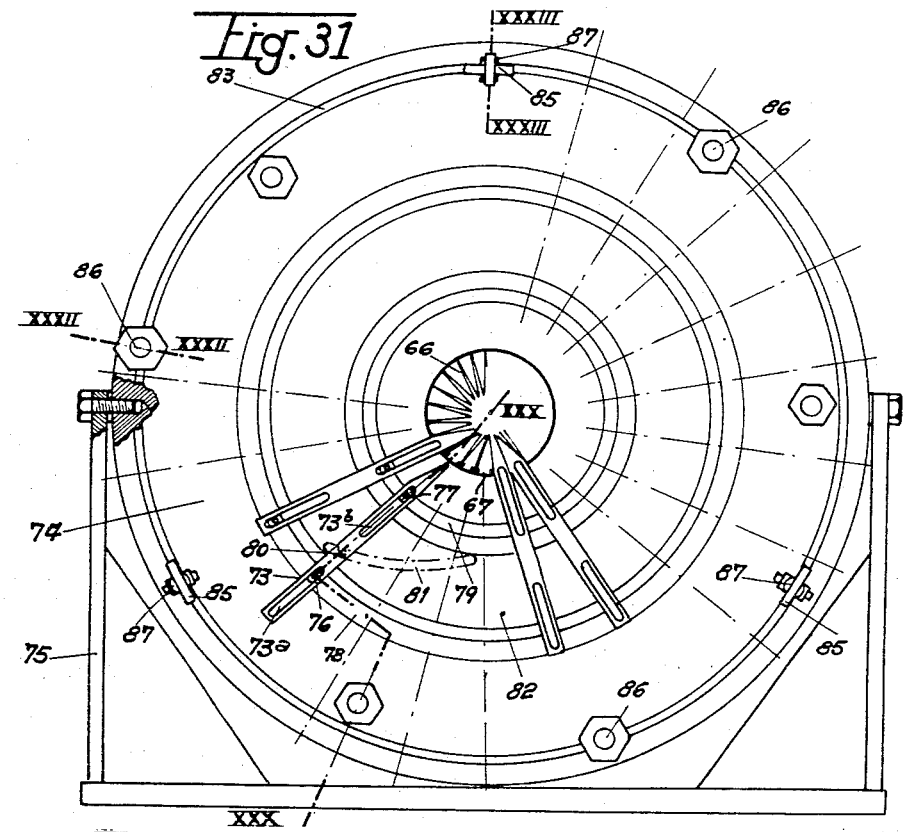

Aug. 30, 1960 L. V. GEWISS 2,950,656
ARRANGEMENT FOR THE MECHANICAL AND CONTINUOUS
PRODUCTION OF DEVELOPABLE
HERRING-BONE STRUCTURES
Filed Jan. 15, 1959 26 Sheets-Sheet 19

INVENTOR
LUCIEN VICTOR GEWISS
By Linton and Linton
ATTORNEYS

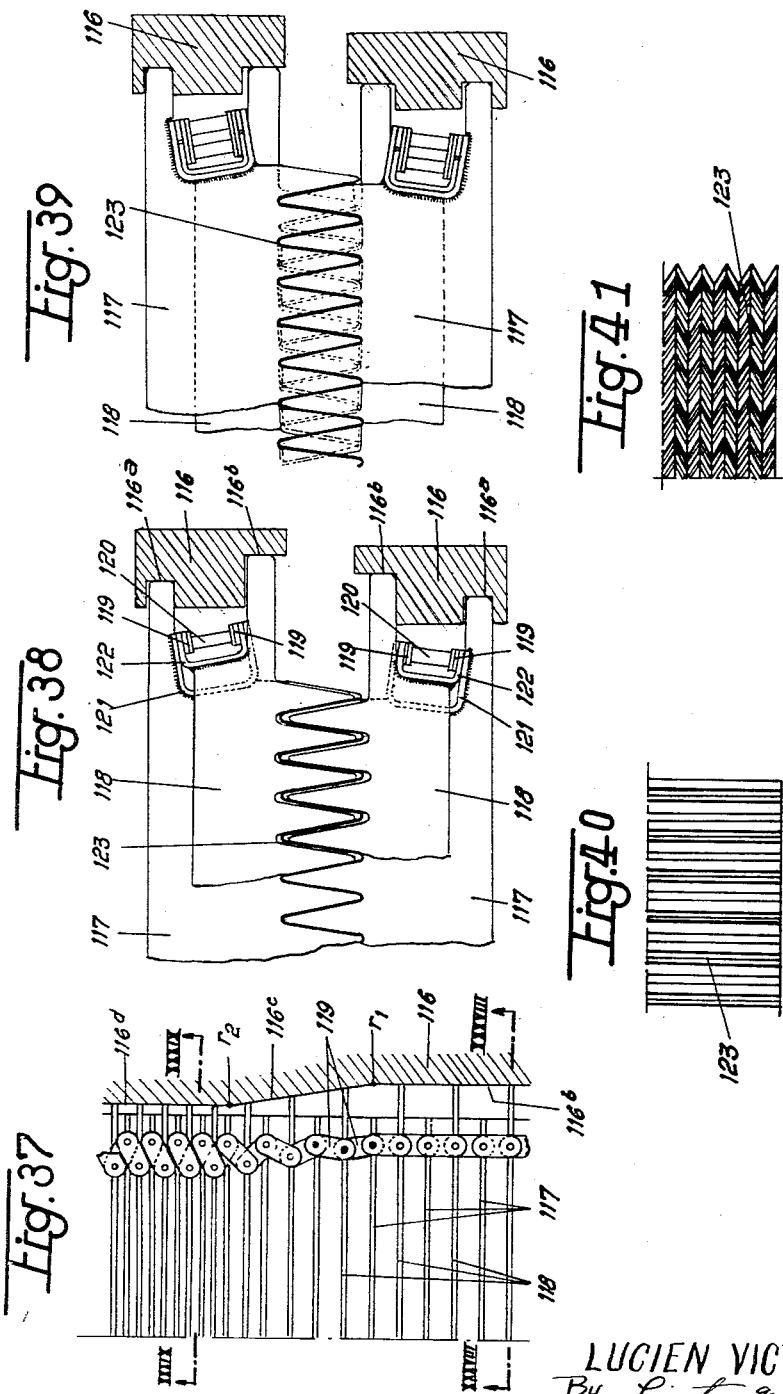

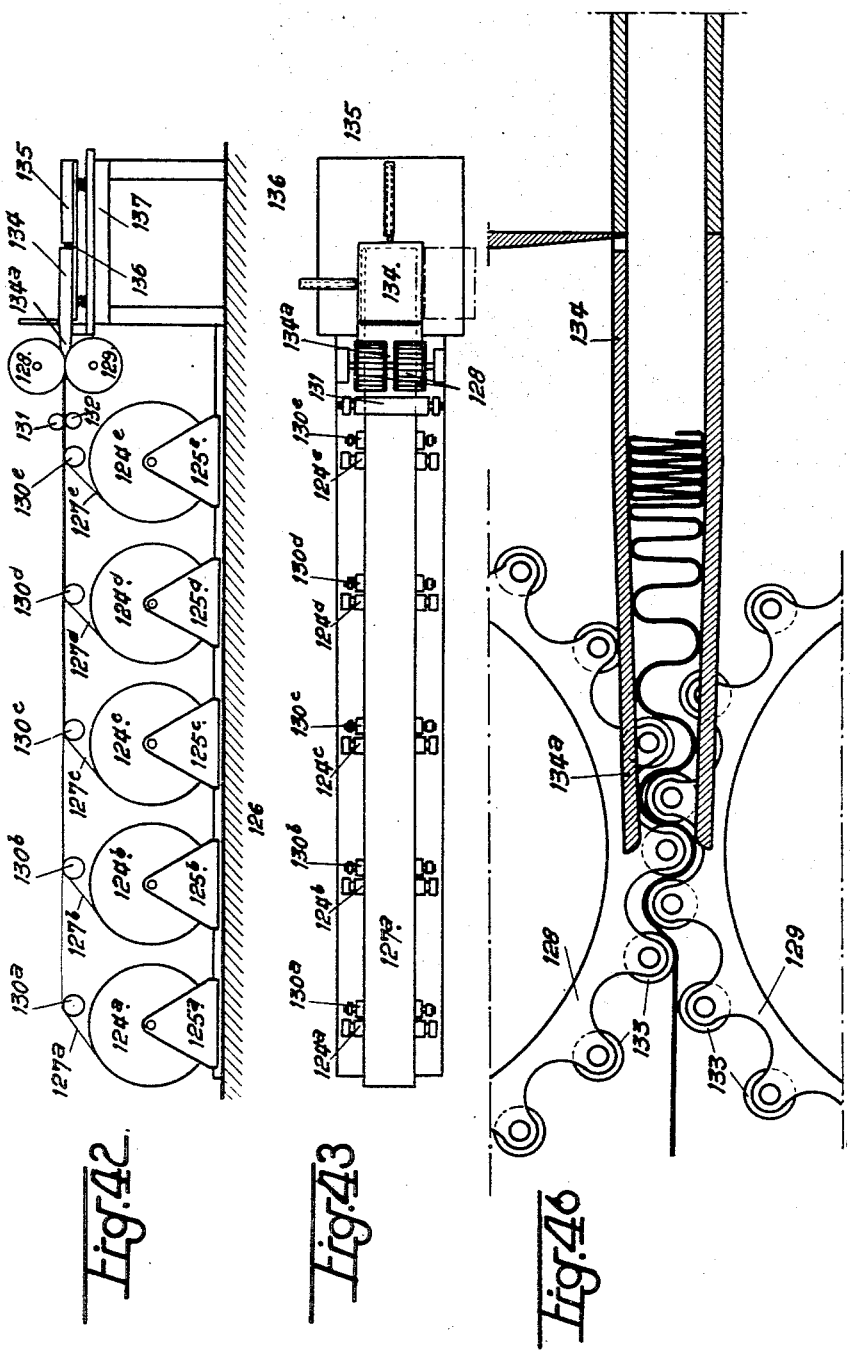

INVENTOR
LUCIEN VICTOR GEWISS
By Linton and Linton
ATTORNEYS

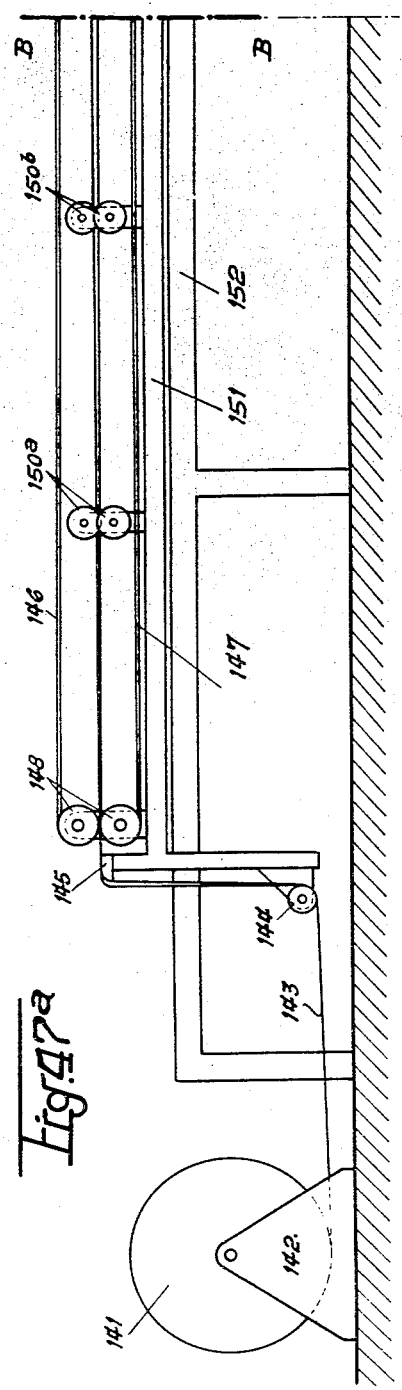

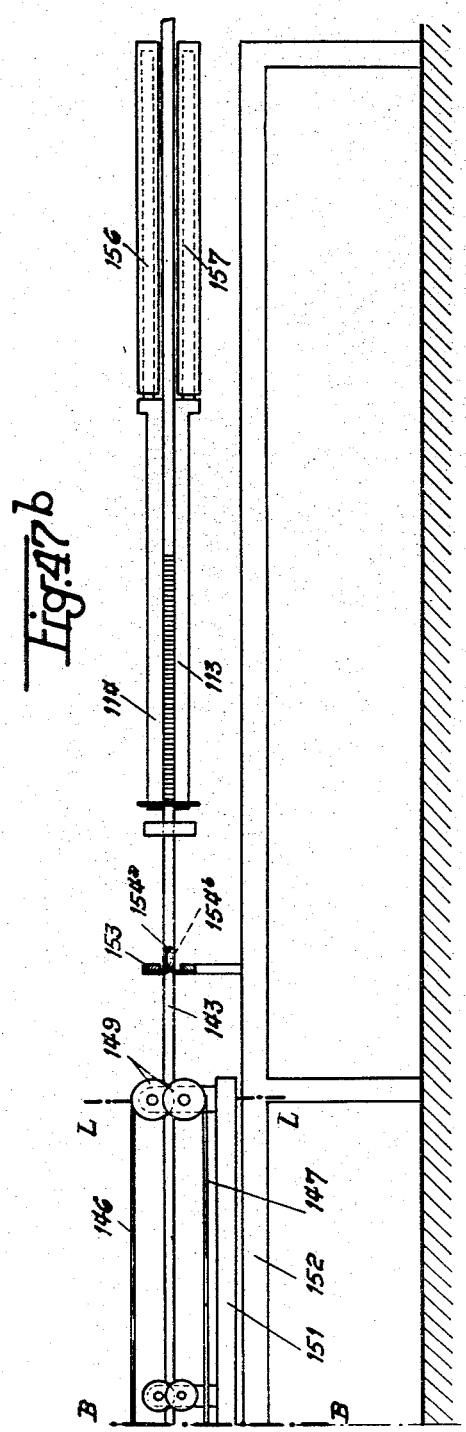

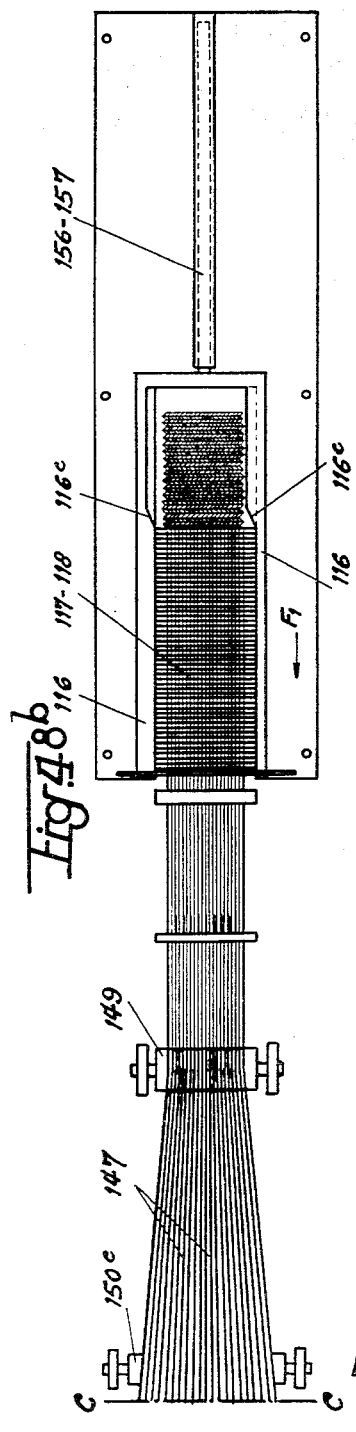

Aug. 30, 1960 L. V. GEWISS 2,950,656
ARRANGEMENT FOR THE MECHANICAL AND CONTINUOUS
PRODUCTION OF DEVELOPABLE
HERRING-BONE STRUCTURES
Filed Jan. 15, 1959 26 Sheets-Sheet 26
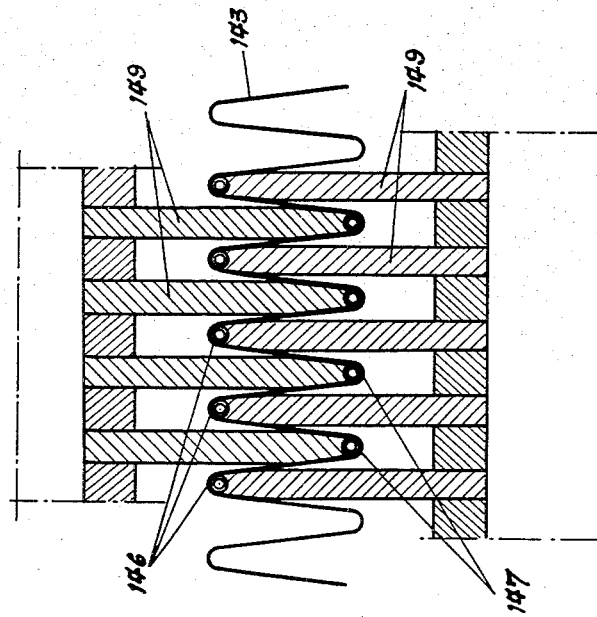
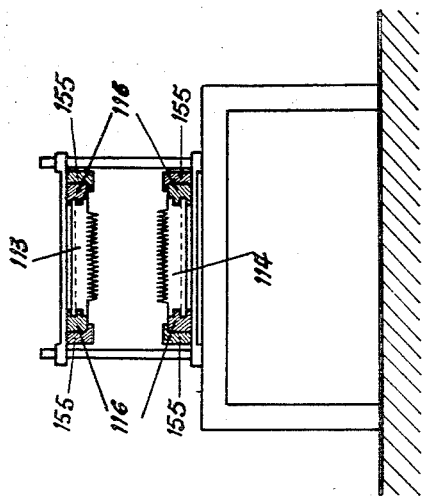
INVENTOR
LUCIEN VICTOR GEWISS
By Linton and Linton
ATTORNEYS United States Patent Office 2,950,656
Patented Aug. 30, 1960

2,950,656

ARRANGEMENT FOR THE MECHANICAL AND CONTINUOUS PRODUCTION OF DEVELOPABLE HERRING-BONE STRUCTURES

Lucien Victor Gewiss, Ville-d'Avray, France, assignor to Marc Wood, Societe Anonyme pour la Promotion des Echanges Techniques Internationaux, Paris, France, a company of France Filed Jan. 15, 1959, Ser. No. 787,031

Claims priority, application France Jan. 16, 1958

17 Claims. (Cl. 93—1)

The present invention has for its object the provision of an apparatus for the mechanical and continuous production of herring-bone structures of the type described in the French Patent 1,106,780, filed on June 10, 1954, and in its additions 66,807, 67,078 and 68,479 to the said patent filed respectively on July 30, 1954, November 29, 1954, and May 17, 1955.

Such herring-bone structures may be defined in their most general embodiment as being made of a flat, preferably thin material folded so as to present in alternation crests and troughs, the upper and lower ridges of which are located on two enveloping surfaces tangent thereto, said upper and lower ridges being oriented along different directions, so as to form to either side of the structure obtained a plurality of zig-zag lines in herring-bone formation, while the elementary lateral surfaces extending between the different ridges are formed by ruled surfaces or by surfaces having a simple curvature defined by geometrical figures such that the sum of their angles leading to any point of each of the ridge lines may be always equal to 360°.

By reason of their geometrical characteristics thus defined, said herring-bone structures present the remarkable property of being all developable so as to form an uninterrupted plane surface, which allows in all cases obtaining them through a mere folding of a flat and thin material such as a sheet or strip.

The arrangements covered by the present invention are intended to provide for the mechanical and continuous execution of the folding of a strip of foldable material of indefinite length into herring-bone formation in accordance with the above definition and more particularly for the production of such structures, the elementary lateral surfaces of which are constituted in a uniform manner by parallelograms, trapeziums, or equal or symmetrical triangles or a combination of these different figures and which are inscribed between two parallel geometrical enveloping surfaces.

The limit case embodiment wherein the lateral surfaces of the structure are formed by joining parallelograms of a very reduced breadth and extend as corrugated strips having parallel curvilinear ridges fall also within the scope of the arrangements covered by the present invention, as defined in the accompanying claims.

The expression "parallel enveloping surfaces" are intended to designate plane enveloping surfaces defining herring-bone structures forming flat sheets adapted to be used in particular as building or packaging materials or for the formation of filtering plates or again of closed circular coaxial enveloping surfaces defining cylindrical or tubular herring-bone structures, more particularly intended for the constitution of filtering cartridges.

In the case of the production of a regular herring-bone structure of a tubular or circular shape wherein the herring-bone arrangement is constituted by longitudinal rows of radial folds distributed uniformly at the periphery of the structure after the manner of the rays of a star, the improved apparatus according to the present invention includes means for ensuring the preliminary formation starting from a strip of material of an indefinite length, of a cylindrical tubular system of an also indefinite length. In this case, the longitudinal straight and parallel folds are obtained at the beginning of the operation through a transformation of the tubular cylindrical system into a prism of a star-shaped cross-section including as many radial arms as the herring-bone structures to be obtained. The means adapted to provide this transformation may include a series of rotary rollers arranged along the generating lines of the tubular system, in radial planes forming with one another equal angles, the number of which corresponds to the number of arms of the star-shaped prism to be formed, said rollers cooperating with a spider arranged axially inside the tubular system and having a corresponding number of ridges along its periphery.

The blades adapted to form the folds of the actual herring-bone structure, the number of which corresponds also to the number of arms of the herring-bone formation to be obtained, are fitted radially on a stationary circular plate, each of said blades being provided with two longitudinal grooves through which they are guided over two angularly shiftable rings mounted coaxially on the stationary plate and being furthermore provided with a tenon engaging a spiral-shaped groove formed in a third movable ring mounted coaxially with the two others on the stationary plate, so that suitable angular movements imparted to said three rings make the whole system of blades execute identical forward and rearward movements together with lateral movements so as to produce the desired herring-bone structure. The dies are fitted on die carrying plates arranged on either side of the blade carrying plate and along the same axis as the latter and are adapted to receive symmetrical movements towards and away from said blade carrying plate. Such forward and rearward movements may be controlled by a fourth-angularly shiftable ring mounted on the blade-carrying plate and provided along its periphery with two sets of cam surfaces or slopes corresponding respectively to each of the die-carrying plates, said cam surfaces or slopes acting on the die-carrying plates through the agency of rollers carried by draw rods subjected to the action of returning springs connected with the corresponding plates. The angular movements of the rings controlling the blades and of the ring controlling the movements of the die-carrying plates may be obtained by links connected respectively with said rings and subjected themselves to a thrust produced by corresponding cams of suitable outlines revolving together on a common driving shaft.

The present invention covers also a number of modifications of the device adapted to execute herring-bone structures forming flat sheets, said modifications being such that they ensure a more rapid production of such structures.

Further features of the invention will appear in the reading of the following description, reference being made to the accompanying drawings, of various embodiments of said invention.

In the drawings:

Figs. 4 and 5 illustrate diagrammatically, respectively in elevational and in plan view, an embodiment of an arrangement for the longitudinal pleating of the strip at the start.

Figs. 6 and 7 are partial views on a larger scale of two pairs of rollers providing the above-mentioned pleating.

Figs. 8 and 9 illustrate respectively in elevational and in plan views the positions occupied by the part of the herring-bone forming means at the beginning of a herring-bone forming cycle.

Figs. 12 and 13 are views similar to Figs. 8 and 9 illustrating the herring-bone forming members at the end of their operative cycle.

Fig. 14 an elevational view, with a longitudinal sectional part passing through line XIV—XIV of Fig. 15, of a complete machine for the production of the actual herring-bone forming cycle.

Fig. 15 is a side view of said machine partly sectional through line XV—XV of Fig. 14.

Figure 16:
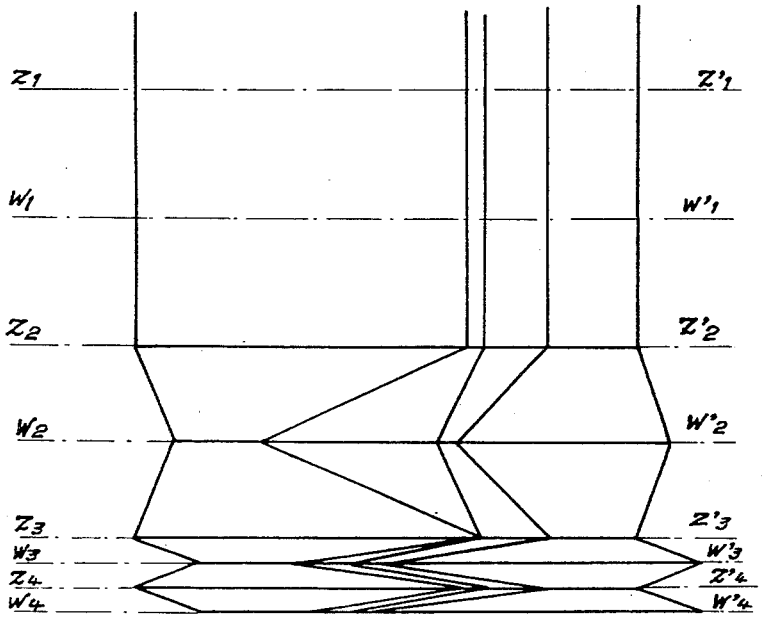
Figure 17:
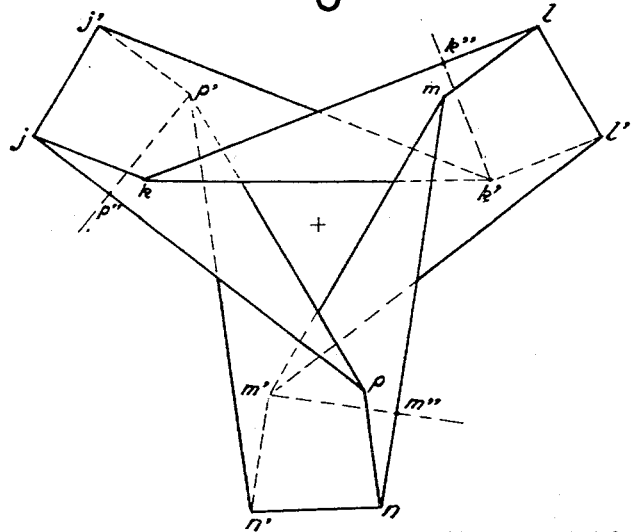

Figs. 16 and 17 illustrate respectively in elevational and in plan view the folds of a circular herring-bone structure with three arms, during its formation.

Figs. 18 to 21 illustrate respectively in a diagrammatic manner four different arrangements adapted to be executed for the formation of a tubular cylindrical system of an indefinite length, starting from a strip of malleable material of an also indefinite length.

Figure 22:
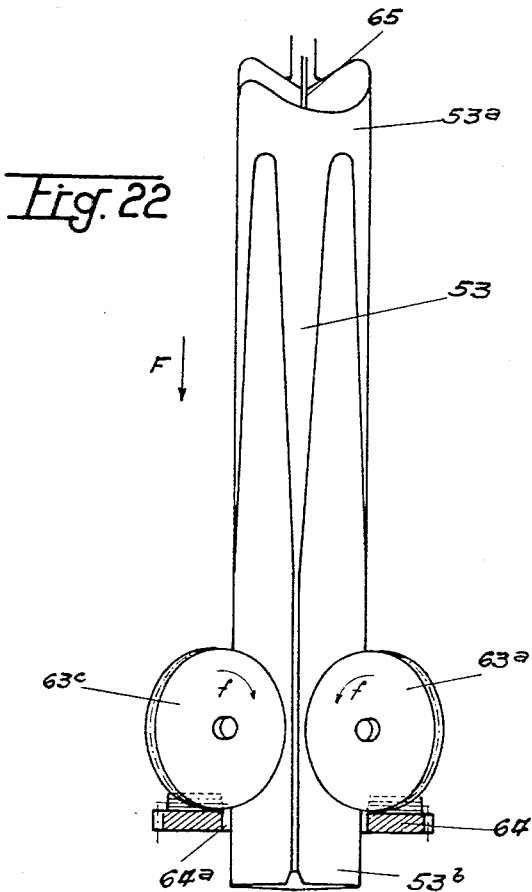
Figure 23:
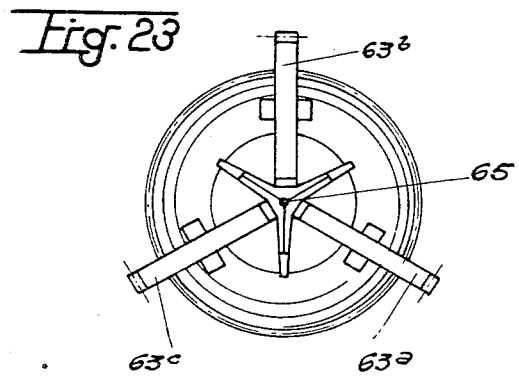

Figs. 22 and 23 are respectively an elevational and a plan view of means for the transformation in a continuous manner of the cylindrical tubular system when formed into a tubular star-shaped prism having three arms and the perimeter of which is equal to that of said cylindrical system.

Figs. 24 and 25, 26 and 27, 28 and 29 illustrate pairwise in elevational and plan views three different positions for the main members of the apparatus providing the continuous formation into herring-bone shape of the tubular prism having a three-armed star-shaped cross section.

Fig. 30 is partly an elevational and partly a longitudinal sectional view through line XXX—XXX of Fig. 31 of a herring-bone forming apparatus operating in conformity with the same principles as in the case illustrated in Figs. 24 to 29, with a view to producing a circular herring-bone structure with twenty-two arms.

Fig. 31 is a front view of the arrangement illustrated in Fig. 30.

Figs. 32 and 33 are respectively longitudinal partial detail sectional views through lines XXXII—XXXII and XXXIII—XXXIII of Fig. 31 respectively.

Figure 34:
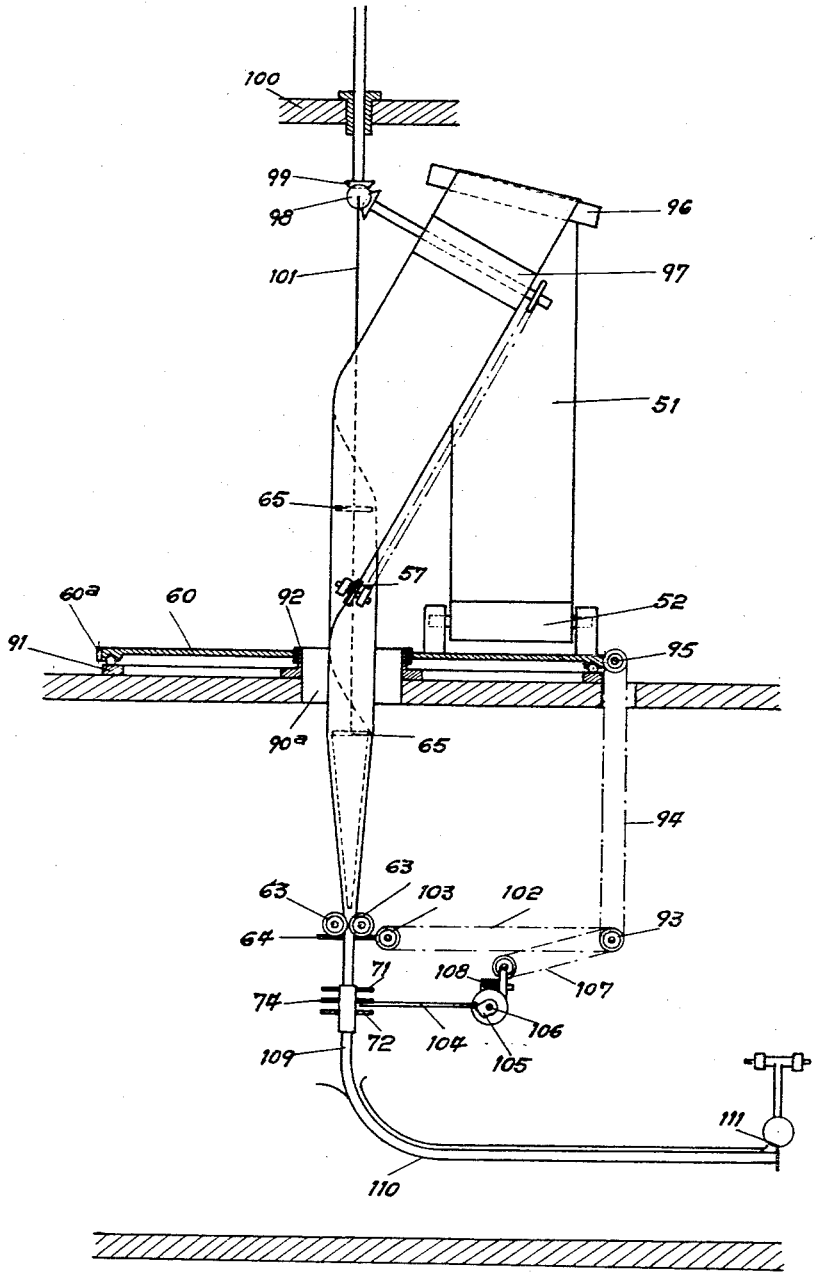

Fig. 34 is a general diagrammatic view on a reduced scale of a herring-bone forming apparatus associating the different mechanisms illustrated in Figs. 21, 22, 30 and 31.

Fig. 35 is a diagrammatic elevational view of an improved herring-bone forming device for the production of flat sheets of herring-bone structures.

Figure 36:
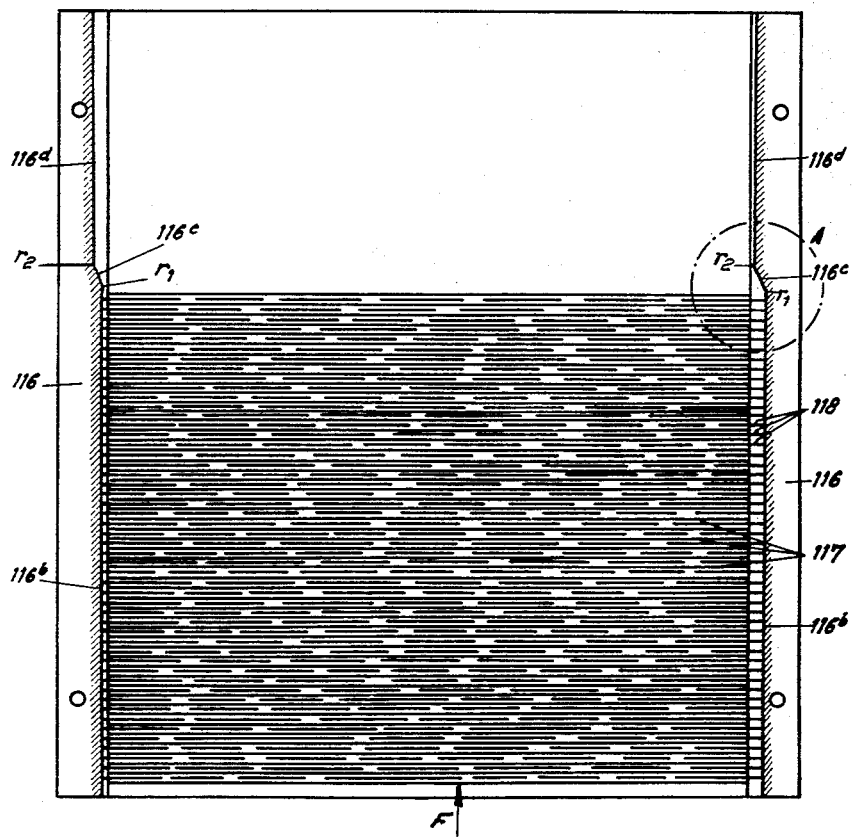

Fig. 36 is a diagrammatic plan view of the lower herring-bone forming grid of the arrangement illustrated in Fig. 35.

Fig. 37 is a detail view on a larger scale of the section of Fig. 36 bounded by the circle A.

Figs. 38 and 39 are cross-sections through line XXXVIII—XXXVIII and XXXIX—XXXIX of Fig. 37 and illustrate the mechanism respectively at the beginning and at the end of the herring-bone forming cycle.

Figs. 40 and 41 are plane views of a fraction of the treated strip, respectively at the beginning and at the end of the herring-bone forming cycle.

Figs. 42 and 43 are general diagrammatic views respectively in elevational and in plan view of a machine adapted to pleat strips transversely in cooperation with herring-bone forming means such as those illustrated in Figs. 35 to 39 for the formation of herring-bone structures of the transverse wave type.

Figure 44:
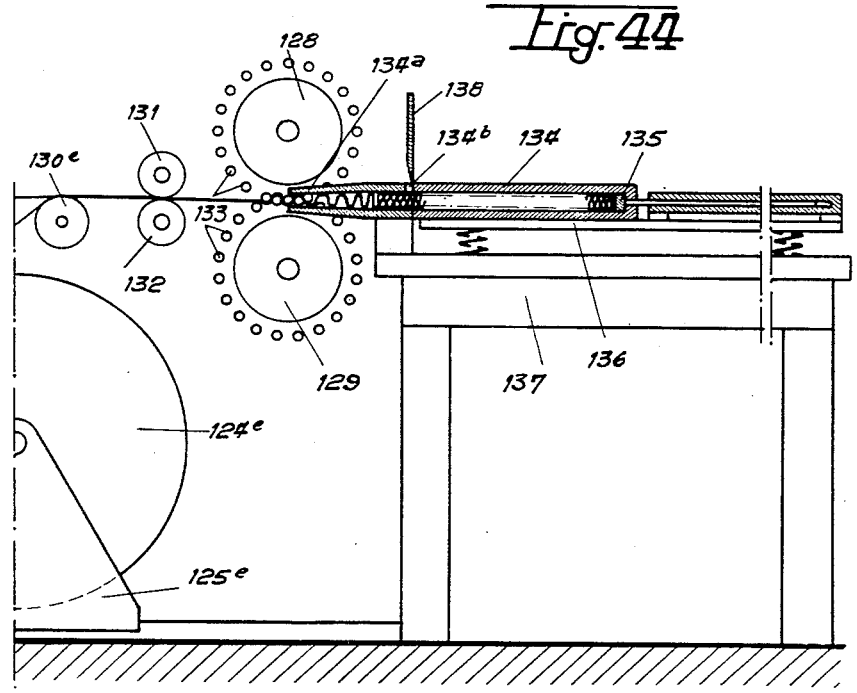
Figure 45:
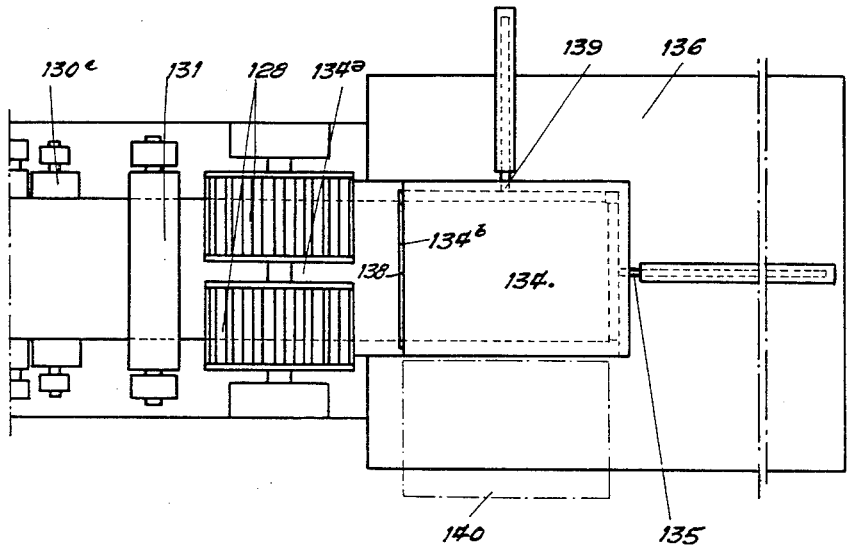

Figs. 44 and 45 are, on a larger scale, respectively an elevational partly sectional view and a plan view of the pleating mechanism and of the take up means in the machine illustrated in Figs. 42 and 43.

Fig. 46 is partly an elevational view, partly a longitudinal view on a still larger scale of the pleating mechanism in said machine.

Figs. 47a and 47b form two sections to either side of line B—B of a diagrammatic elevational view of a machine for producing herring-bones with longitudinal waves.

Figs. 48a and 48b form two sections corresponding respectively to Figs. 47a and 47b of a diagrammatic plan view of the same machine.

Fig. 49 is an end view of the same machine.

Fig. 50 is a cross-sectional view on a larger scale through line L—L of Fig. 47b of the means for longitudinally pleating strips, said means forming part of last-mentioned machine.

Figure 1:
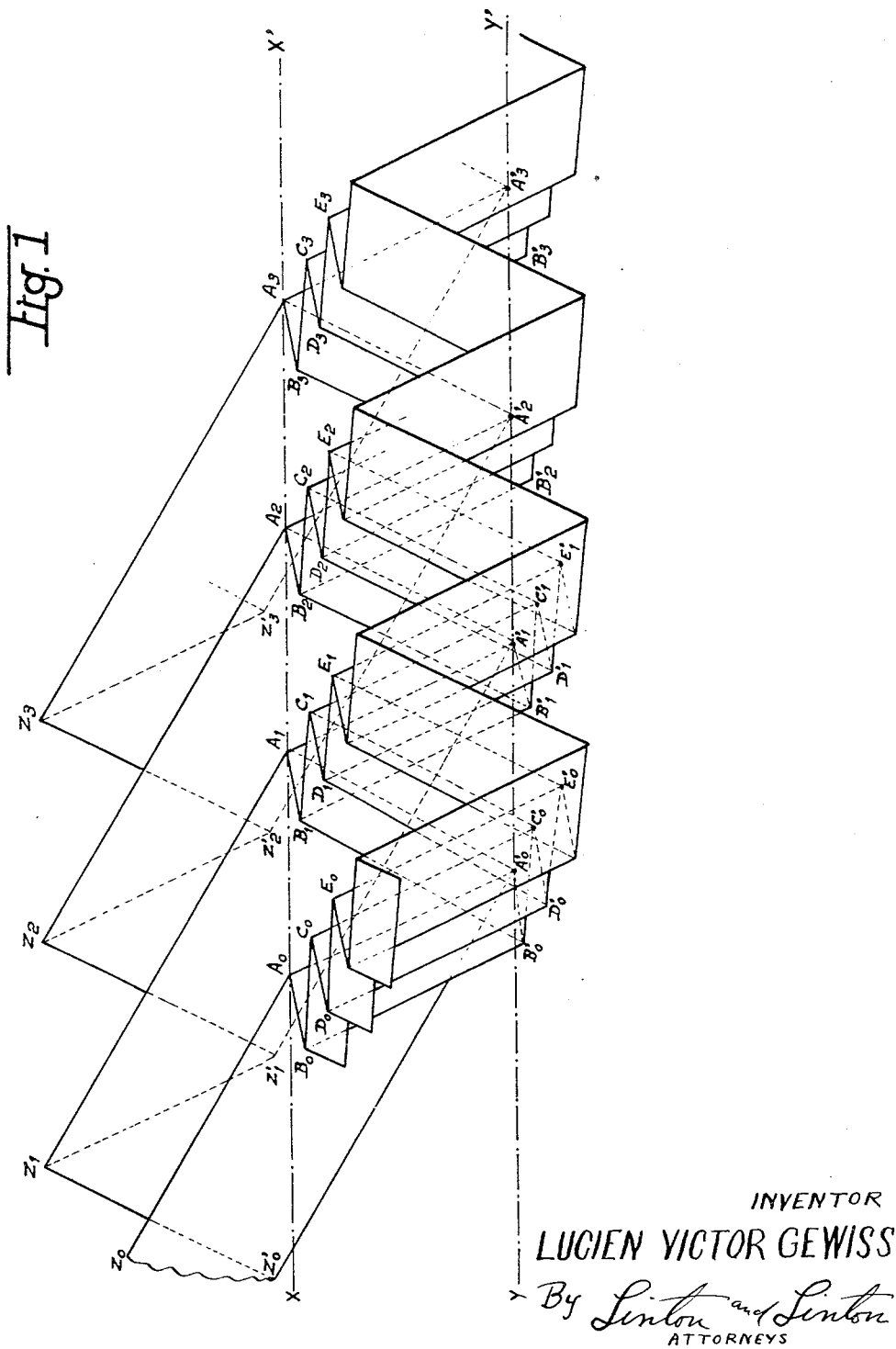
Fig. 1 is a perspective view of a simple pleated structure, including a front extension forming a uniform herring-bone structure lying in flat formation and including equal and symmetrical surfaces in the shape of parallelograms.
Figure 2:
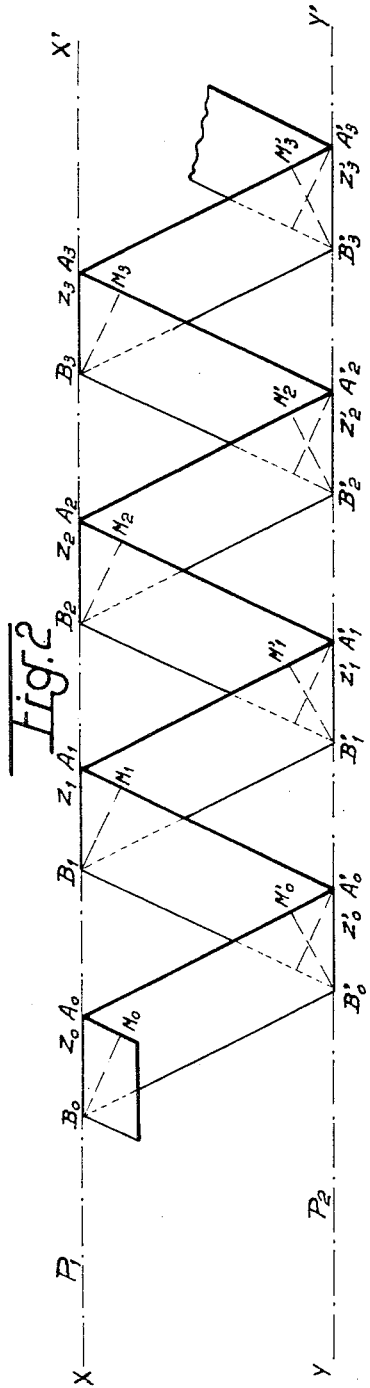
Figs. 2 and 3 are respectively an elevational and a plan view of the same herring-bone structure in the making.
Figure 3:
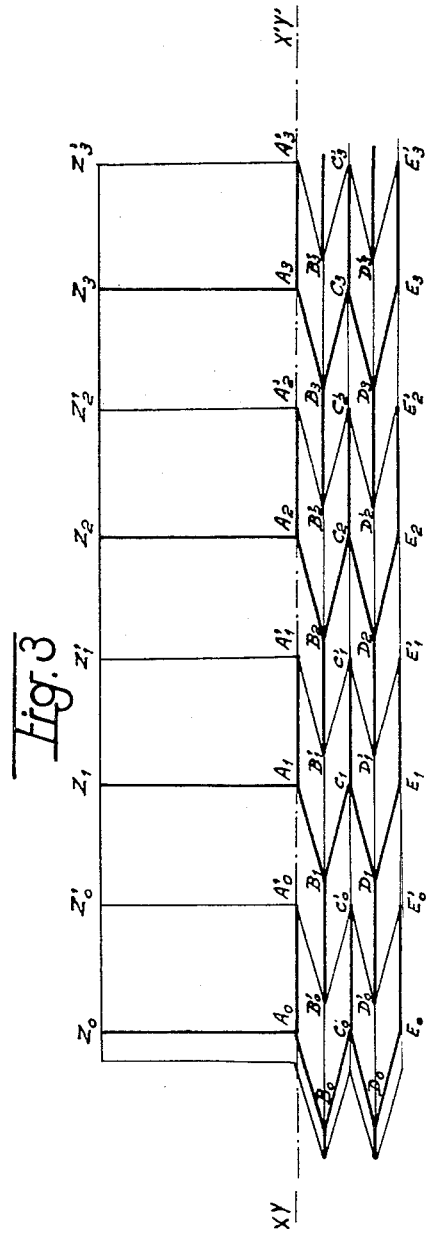
Figure 10:
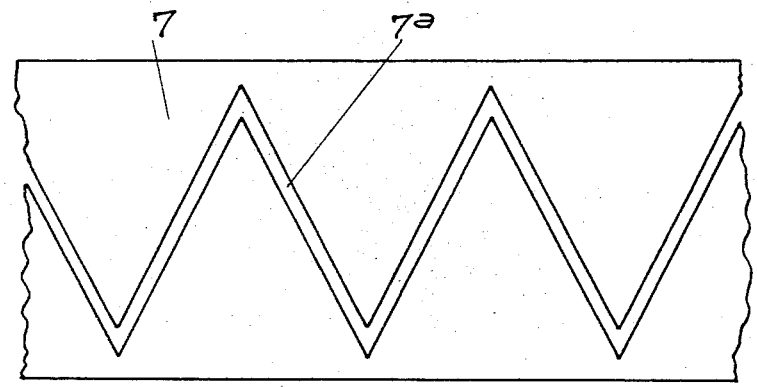
Figs. 10 and 11 are partial elevational views of two dies forming part of the herring-bone forming means.
Figure 11:
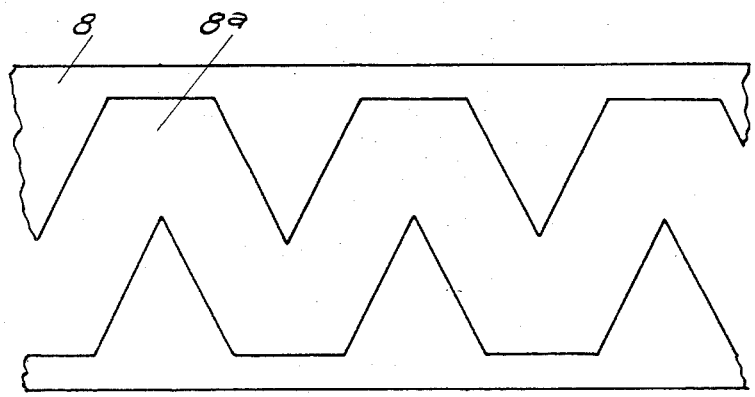

The herring-bone structure in the making is illustrated in Figs. 1, 2 and 3 respectively in perspective, elevational and plan view and it is constituted by means of a pleated structure obtained through a sheet or strip of foldable material, said structure including large, simple and regular folds parallel with each other and including an extension forming the actual herring-bone structure with surfaces shaped as regular parallelograms adapted to be obtained naturally with such a pleated structure.

The plane in which the original pleated structure merges into the final herring-bone structure is a vertical plane containing the two straight lines X—X' and Y—Y'. The two structures are both inscribed between the same two horizontal parallel planes P1 and P2 of which the traces coincide in Fig. 2 with the lines X—X' and Y—Y'. In the vertical connecting plane XX'—YY' separating said structures, the latter have a common broken-line trace A0—A'0, A1—A'1, A2—A'2 etc., which is constituted merely by their common cross-section.

Hereinafter, the broken line ridges such as A0, B0, C0, D0, etc., A'0, B'0, C'0, D'0, etc., and A1, B1, C1, D1, etc., A'1 B'1 C'1, D'1, etc., forming extensions of the folds Z0—A0, Z'0—A'0, Z1—A1, Z'1—A'1, etc., of the original pleated structure will be termed the large folds while the ridges such as A0—A'0, B0—B'0, A'0—A1, B'0—B1, etc., connecting two by two the breaks in the large fold will be termed the small folds.

When spacing apart in parallelism with their general line of fold, the original pleated structure and the herring-bone structure into which it merges so as to straighten the section of the elementary herring-bone structure A0—B0—C0, A'0—B'0—C'0, A1—B1—C1, A'1—B'1—C'1, etc., continuing directly the pleated structure with a view to returning said elementary section into the shape of the original pleated structure, it is found that:

The small folds such as A0—A'0, B0—B'0, A'0—A1, B'0—B1, etc., are gradually wiped out.

The large folds such as A0—B0—C0, A'0—B'0—C'0, A1—B1—C1, A'1—B'1—C'1, etc., have moved so as to form finally sections of straight ridges A0—C0, A'0—C'0, A1—C1, A'1—C'1, etc., and to come into accurate alignment with the ridges Z0—A0, Z'0—A'0, Z1—A1, Z'1—A'1, etc., of the pleated structure.

The section of the herring-bone structure considered has thus been transformed into a section of the pleated structure of an equivalent area. Along its sides as shown in Fig. 2, the points such as B0—B'0, B1—B'1, B2—B'2, etc., occupy respectively positions M0—M'0, M1—M'1, M2—M'2, etc., corresponding to their original projections on the extension of the outline of the pleated structure. Under such conditions it is apparent that conversely the small folds such as B1—B'0, and B1—B'1 of the herring-bone structure should be considered as the final positions reached at the end of the actual shifting in planes perpendicular to the sides of the pleated structure of lines such as M1—A'0 and M'1—A1 originally forming part of the sides A1—A'0 and A1—A'1 of the pleated structure.

During the spacing of the pleated and herring-bone structure, produced as disclosed, the small folds such as A1—A'0 of a given side of the herring-bone structure which were originally adjacent have moved with reference to each other by a distance equal to twice the spacing between small folds and are finally wiped out from the sides when the structure has returned into its original pleated position. Under such conditions, the section of the herring-bone structure considered should be considered conversely as being obtained through an actual shifting into positions such as B1—B'0 and B1—B'1 of lines such as M1—A'0 and M'1—A1 carried by the sides of a pleated structure of equal area defined by two adjacent cross-sections spaced from each other by an interval equal to twice the space extending between small folds of the herring-bone structure.

Similar conclusions may be drawn, as apparent from the following disclosure, as concerns the herring-bone structure and pleated structure associated therewith, whatever may be their type.

The mechanical production of herring-bone structures according to the present invention resorts to the above description, so as to allow the formation in successive sections of any herring-bone structure, starting from the initial pleated structure corresponding thereto, as obtained by acting in a suitable manner on the sides of the pleated structure along uniformly spaced lines for the actual shifting of said lines into the positions they are to occupy finally in the herring-bone structure.

Taking this into account, it is apparent that the mechanical means adapted to produce a straight herring-bone structure in a flat sheet of an unlimited length should be designed in a manner such as will ensure first the continuous longitudinal pleating of said sheet. Said pleating presents no particular difficulty in its production. The preferred arrangement provided by the present invention for producing said pleating is illustrated diagrammatically in the general views (Figs. 4 and 5).

As apparent from said figures, the sheet 1 to be pleated, say a sheet of paper, is fed from a roller 2 and is caused to extend first vertically and then reaches a flat carrier table 3, the rear end 3a of which (Fig. 5) matches the arc of a circle a—a' corresponding to the convergence to be obtained through the gradual closing of the longitudinal folds during the formation stage. The sheet or strip then extends horizontally before it engages in a suitably pleated condition, the herring-bone forming machine illustrated diagrammatically at 4. To either side of the sheet 1 moving between the table 3 and the herring-bone forming machine 4, are arranged pairs of rollers 5a, 5b, 5c, etc., driven into rotation in a suitable manner, said rollers being constituted by the juxtaposition of coaxial frusto-conical rolls, the conicity of which increases gradually, while their axial length is reduced, so that they match the shapes of folds which are gradually deeper and closer, so as to produce the pleated structure adapted to form the material for the herring-bone structure.

Fig. 6 shows the shape to be given to rolls constituted by one of the first pair of rollers, such as 5b, for instance, at the beginning of the pleating operation, and Fig. 7 shows the shape of the rolls forming a pair of rollers such as 5n for instance, corresponding to a more advanced stage of pleating. The pleating is thus performed under excellent conditions. The only care to be taken consists in shifting sufficiently each pair of rollers away from the adjacent pair, so that the sheet 1, the edges of which are parallel both at the output of the roller 2 and after the final pleating may, by reason of the elastic elongation of the material forming the sheet have its outer edges appear convergent during the gradual formation of the folds.

Under the action of the pleating rollers, the sheet 1 which is being pleated progresses rigidly at a uniform well-defined speed. It engages the herring-bone forming machine 4 and moves out of the latter at 6 in the shape of an indefinite length of herring-bone structure. The design and the operation of the herring-bone machine are disclosed hereinafter in detail, reference being made to Figs. 8 to 13.

The pleated sheet 1 enters first a die 7 (Figs. 9 and 10), the inner shape 7a of which matches exactly, with however a certain clearance to allow sliding, the zig-zag outline of the large folds. At a distance corresponding to the height of two small folds to the front of the output of said first die 7 is positioned the rear input surface of a second die 8 (Figs. 9 and 11) the inner outline 8a of which corresponds to that of the finished herring-bone structure with its closed folds as shown in Fig. 9, taking into account the fact that a certain tightening is obtained.

In the medial vertical plane XX'—YY' located at equal distances from the surfaces facing each other in the dies 7 and 8, there is provided a double series of folding blades 9 and 10 (Figs. 8 and 9), the operative edges of which are inclined with reference to a vertical line by angles equal to the corresponding pleating angles while their free ends lead respectively to points such as N0, M1, M2, etc., and M'0, M'1, M'2, etc., as defined hereinabove. All the blades 9 located to one side of the pleated structure are carried by a transverse blade-carrier 11, while all the blades 10 on the other side of said structure are carried by the blade-carrier 12. The two blade-carriers 11 and 12 are provided respectively at their ends with projections 13a, 13b and 14a, 14b which engage slidingly oblique grooves 15a, 15b and 16a, 16b provided in the frame which is not illustrated in Figs. 8 to 13, which frame carries the dies 7 and 8 and the blade-carriers.

At the beginning of the cycle of formation of a section of the herring-bone structure, the precedingly formed herring-bone structure has been shifted beyond the rear surface of the die 8 as shown at C0, D0, E0 . . . C'0, D'0, E'0 . . . C1, D1, E1, in Fig. 9. The space comprised between two surfaces facing each other on the dies 7 and 8 is then filled with a length of the pleated sheet which is equal to twice the spacing between successive small folds of the herring-bone structure.

As soon as the cycle of operation begins, the blade-carriers 11 and 12 move respectively in the direction of the arrows f1 and f2 and the operative edges of the two series of blades 9 and 10 begin acting on the sides of the pleated structure, the dies 7 and 8 being simultaneously shifted in the direction of the arrows f'1, f'2 (Fig. 9), so that their inner surfaces may move towards each other. The shiftings imparted to the blades 9 and 10 and to the dies 7 and 8 are obviously at every moment the actual movements corresponding to the formation of the small folds.

In practice, since the pleated sheet 1 progresses towards the die 7 at a uniform speed, the system which has just been described can operate suitably only with a contrivance adapted to prevent any shifting of the relative position of the movable elements moving together with the pleated sheet, to wit the dies 7 and 8 and the blade-carriers 11 and 12. To this end, the frame carrying the dies and the blade-carriers is movable and it assumes a sinusoidal movement which is imparted to it by a mechanism to be described hereinafter and which includes in principle a connecting rod, the head of which revolves over an eccentric member which describes one revolution per cycle of herring-bone formation. The eccentricity of said eccentric member is such that the frame assumes at the moment zero at the beginning of any cycle (Figs. 8 and 9) a movement of maximum speed which is equal exactly to that of the pleated sheet 1. This speed of movement decreases gradually and is equal to zero after one quarter of a cycle. During the second quarter of the cycle, the speed of the movement increases again until it reaches the speed of the pleated sheet but in the direction opposed to that of the latter. During the third quarter of the cycle, the speed of movement decreases again, until it is equal to zero and it increases again during the last quarter of a cycle, so as to reach as to intensity and direction, the value of the continuous movement of the paper sheet. From this moment onwards, the two dies 7 and 8 register therefore exactly with the pleated sheet.

Under such conditions, the die 7 advances with reference to the frame during the first quarter of a cycle exactly by the distance lost by the latter upon slowing down its movement with reference to the pleated sheet. During the same time, the die 8 advances with reference to the frame towards the die 7 by a movement of the amplitude of which is exactly equal to that of the latter, although it is of course of an opposite direction. At a point distant from the point at which the dies meet and as soon as the folds are sufficiently near for their complete subsequent folding to be obtained automatically, which result is reached for instance for the position of the members illustrated in Figs. 12 and 13, while the points such as M0, M1, M2, . . . M'0, M'1, M'2 . . . have been brought by the ends of the blades 9 and 10 into the positions N1, N2, N3 . . . N'0, N'1, N'2, N'3 . . . , the blades 9 and 10 are released from the herring-bone structure and the two dies return speedily into their positions of relative maximum spacing.

As soon as the change of the direction of movement of the blades and dies is obtained, the pleated sheet 1 slides at a high speed through the die 7 and, under its thrust, the folds such as A0, N0, C0, A'0, N'0, C'0, A1, N1, C1, A'1, N'1, C'1, etc., become gradually more marked until they assume the shape of the first section of the herring-bone structure A1, B0, C0, A'0, B'0, C'0, A1, B1, C1, A'1, B'1, C'1, etc., as illustrated in Fig. 3. Said marking of the folds is obtained slowly since the die 8 is shifted aside in accordance with a movement identical in absolute value with that of the die 7, so as to become nearer and nearer that of the pleated sheet. This movement is in fact equal at any moment to the algebraic sum of the movement of the frame which has a tendency to drop down to a value equal to and of the same sign as that of the movement of the pleated sheet, and of the actual movement of the die 8 which is also of the same sign and which has a tendency to drop down to zero before it is reversed.

As soon as the dies begin their return movement, the inner surface of the die 7 moves away from the folds A0, N0, C0, A'0, N'0, C'0, etc. These folds progress thus with reference to the median plane of the blades 9 and 10 so that each of these may return into its original position as illustrated in Figs. 8 and 9, without meeting the fold already formed to its rear.

Immediately before the end of the cycle of operations, the different movable members have thus returned into their corresponding starting positions and are ready to begin the cycle over again. The movable frame progresses in fact again by a movement equal to that of the pleated sheet 1 and in the same direction as the latter, while the two dies 7 and 8 are stationary and are spaced from each other by a distance equal to the breadth of two small folds, while the blades 9 and 10 are already in contact with the sides of the longitudinal folds of the pleated sheet, which folds have progressed underneath them.

The succession of such cycles ensures thus by reason of the double fold formed during each cycle the continuous formation of the herring-bone structure of the pleated sheet.

The mechanical arrangements adapted to communicate to the different movable elements the movements required for the execution of the above-described cycle may be modified, in particular in accordance with the requirements of the herring-bone structure which is to be obtained: breadth of the sheet, stiffness of the material, respective size of the small and large folds, etc. Figs. 14 and 15 illustrate respectively in longitudinal and in transverse cross-section, in a somewhat diagrammatic manner, a herring-bone structure-forming machine incorporating the above-mentioned cycle of operations and more particularly suitable for the obtention under continuous transfer conditions of a horizontal sheet in herring-bone formation, by folding a strip of filtering paper of an average breadth and of which the preliminary longitudinal folds have been formed in accordance with the general diagram of Figs. 4 and 5.

As illustrated in said example, the machine includes a stationary main frame 17 comprising in its upper part two parallel guiding bars 18a and 18b, the axes of which extend inside the horizontal plane serving for the progression of the pleated sheet 1 fed by the pleating arrangement of Figs. 4 and 5. Over said bars may slide horizontally both the movable frame 19 carrying the blade-carriers 11 and 12 equipped with the blades 9 and 10 respectively and the sleeves 20 and 21 carrying respectively the dies 7 and 8.

The movements of the different members are controlled by a motor 22 which transmits its rotation through a speed reducer including a worm 23 and a wormwheel 24, to a shaft 25 revolving inside bearings 26, 27 and 28 rigid with the pedestal of the frame 17. To the shaft 25 are keyed a cam 29 acting through its periphery and adapted to control the movements of the dies 7 and 8, a drum-shaped cam 30 adapted to control the movements of the blade-carriers 11 and 12 and the eccentric member 31 adapted to control the sinusoidal movement of the movable frame 19.

The cam 29 acts on a roller 32 mounted on a push-member 33 moving vertically and guided at its lower end by a fork 33a engaging the hub of the cam 29 to either side thereof, said push-member being connected at its upper end with two symmetrical bell cranks 34 and 35 pivotally secured to the underside of the movable frame 19 and connected on the other hand respectively with the die carrying sleeves 20 and 21.

The drum-shaped cam 30 acts on a roller 36 carried by the lower end of a lever 37 rockably secured to a carrier arm 38 and the upper end of which is pivotally connected with two symmetrical links 39 and 40, which latter are connected on the other hand respectively with the blade-carriers 11 and 12, while the latter are carried in their turn by the movable frame 19, as mentioned hereinabove, inside the sloping guiding grooves 15a, 15b, 16a, 16b formed in the side walls 19a, 19b of said frame.

Lastly, the eccentric member 31 acts on the forked end 41a of a bent lever 41 rockably secured to a stationary support 42 and connected furthermore with the movable frame 19.

The machine designed in the manner described hereinabove allows forming continuously herring-bone structures according to the cycle referred to, said structures being constituted by parallelograms, whatever may be the sizes to be considered, provided their enveloping or enclosing surfaces are flat and parallel. Its structure allows consequently obtaining also herring-bone structures extending along corrugated surfaces since such structures actually include equal and symmetrical parallelograms, two of the parallel sides being however curvilinear since the ridge lines of said corrugated structures are sinuous. In such a case, the parts of the machine all operate exactly in the same manner. Only the outline of the blades 9 and 10 and the front inner periphery of the die 8 should of course match the shape of the curvature substituted for the fold at corresponding points of the structure.

The following description relates now to the application of the present invention to the production of herringbone structures including equal and symmetrical trapeziums and of which the enveloping surfaces are constituted by coaxial cylinders, i.e. herring-bone structures of a generally tubular shape of the type used e.g. for the constitution of filtering cartridges.

Hereinafter, it is assumed for sake of a simpler disclosure that it is desired to produce a herring-bone structure with three arms. Only the ultimate diagrams which relate to a machine adapted to execute the method to be described, relate to a normal herring-bone structure including a larger number of arms distributed along the periphery of the tubular system, say a herring-bone structure with twenty-two arms.

The annular herring-bone structure which is shown in the making in Figs. 16 and 17 respectively in elevational and in plan view, is constituted by a tubular prismatic system with three equal surfaces, said system being constituted in its turn starting from a cylindrical tubular system obtained by one of the methods described hereinafter and which is transformed through means which will also be described into a regular tubular star-shaped prism. The section of Fig. 16 located above the plane Z2—Z'2 illustrates the star-shaped tubular prism before the formation of the herring-bone structure while the section located between the plane Z2—Z'2 and the plane Z3—Z'3 includes a row of folds of the herring-bone structure in the making, and lastly the section lying underneath the plane Z3—Z'3 includes rows of folds of the herring-bone structure in its completely folded condition.

Figs. 16 and 17 show all the sections such as those defined by the planes Z3—Z'3, Z4—Z'4 as identical, said section being projected on the plane of the drawing along the outline j—k—l—m—n—p. The cross-sections such as W2—W'2, W4—W'4 are also identical and are projected on the plane of Fig. 17 along the outline j'—k'—l'—m'—n'—p'. The two types of projections thus defined are obviously equal and form mirror images of each other.

Under such conditions, it is apparent that if a folded element of a section such as Z3—Z'3 of the herring-bone structure such as j'—k'—l'—l—k—j for instance, is stretched vertically, it occupies the location of the side, the trace of which is shown at j—k—l in Fig. 17. This is also true for the two other folded elements of the herring-bone structure shown at l'—m'—n'—n—m—l and at n'—p'—j'—j—p—n forming part of the same horizontal cross-section and it is obvious that each element of the fold of the developed herring-bone structure is straightened along the three sides of a common horizontal cross-section of a tubular prism of which the trace in the plane of Fig. 17 is j—k—l—m—n—p. The height of each section of the prism extending between two planes such as Z1—Z'1 and W1—W'1 (Fig. 16) is equal to the distance extending between the small folds of the herring-bone structure.

It is thus apparent that the showing of Fig. 16 described hereinabove as showing such a prism above the plane Z2—Z'2, furthermore, the beginning of the herring-bone structure between the planes Z2—Z'2 and Z3—Z'3, and a finished herring-bone section between Z3—Z'3 and Z4—Z'4, is in principle true.

In practice, this is however not quite the case and, as a matter of fact, the straight ridges of the prism do not actually form the peripheral edges j—j'—l—l'—n—n' of the herring bone structure. As a matter of fact, there arises during the formation of the herring-bone a slight deflection of the ridges of the prism in either direction to either side of the central point located at mid-height of each section defined by planes such as Z1—Z'1 and W1—W'1, said point being the only common point. The six slight half-deflections opposed two by two produced on the three ridges of the prism to either side of the medial plane of each of the sections of the latter, compensate one another. During the formation of the chevrons a slight deviation or deflection of the edges or ridges of the prism is produced in one direction or the other, with reference to a central point situated midway of the height of each wave or ridge bounded by planes such as Z1—Z'1 and W1—W'1. The half deflections just mentioned are the partial deviations which are produced on each of the three edges of the prism, on the respective sides of this central point. Finally, the tubular prism has a surface which is accurately equal to the sum of the folds of the corresponding annular herring-bone structure.

The preceding description allows understanding how the annular herring-bone structure may be obtained through to folding, section after section, in the desired direction of a tubular prism having a suitable outline. Examination of Figs. 16 and 17 shows that the annular structure illustrated is actually the result of the transfer in the planes W2—W'2, W3—W'3 and W4—W'4 of cross-sections of the prism originally set at equal distances from the cross-sections such as Z2—Z'2, Z3—Z'3, and Z4—Z'4 separated from one another by distances equal to the height of two small transverse folds. However, it is apparent that during the folding, the broken line traces of the prism such as j—k—l are transferred to j'—k'—l' at the level of the cross-sections such as W2—W'2 because an oblique fold is formed between k and k' so as to allow the two halves of the side to be turned towards each other. Since during the transfer, the movements of the segments j'—p, l—k and n—m are performed in parallelism with their own direction, the point p'' which forms the projection of p' on j—p enters the position p' while k'' which is the projection of k' onto k—l enters the position k' and similarly m'' which is the projection of m' on the line n—m enters the position m'. The differences between the lengths j—p'' and j'—p', l—k'' and l'—k'', n—m'' and n'—m' are precisely those which are ascribable to the confusion between the straight ridges of the prism in their horizontal projection and the broken lines constituted by the peripheral folds of the herring-bone structure.

Taking into account the preceding description, it is apparent that the means adapted to produce the annular herring-bone structure with a sheet of foldable material of an indefinite length and of a constant breadth should be designed so as to ensure in succession:

The formation of a tubular cylindrical system of an also indefinite length.

The transformation of said system into a star-shaped prism including the desired number of arms.

The actual herring-bone structure.

The continuous formation of a tubular system does not meet with any particular difficulty. It leads however to the necessity of a comparatively large space for operation because the permeable sheets used for the execution of filtering cartridges and chiefly filtering paper remain very fragile for the large breadths of utilisation required, so that they can be subjected only to very unsubstantial deformations and they cannot obviously be subjected to any creasing or elongation.

It is possible in particular to resort for this continuous formation, to one of the four following methods:

The first method the execution of which is illustrated diagrammatically in Fig. 18 is the roughest method. Said method does not lead in fact to a continuous production; it consists in cutting transversely the strip of material 51 wound off the roller 52 so as to form sections of a suitable length assembled along their edges along a generating line so as to form separate tubular elements such as 53a, 53b, 53c, which are thenafter connected endwise.

The second method, illustrated diagrammatically in Fig. 19, consists in unwinding off the roll of material 52, a strip 51 of a sufficient length for it to be possible to incurve it gradually in a longitudinal direction until its edges meet at 54. At this point, the assembly of the edges of the sheet is ensured through a suitable arrangement including for instance a bearing member 55 carried by a stationary arm 56 engaged inside the incurved and rolled sheet and an outer connecting member illustrated in the present case as a roller or wheel 57. After its passage through a circular guide such as 58, the tubular system obtained 53 is released at 59 in its correct desired formation.

The third method, illustrated diagrammatically in Fig. 20 is similar to that above described, but it provides for the formation of the tubular system, starting from two strips 51a, 51b wound off two parallel rolls 52a, 52b and which are incurved symmetrically until their opposed edges meet two by two and are assembled through arrangements 55—57 similar to that described with reference to Fig. 19.

In this case, the finished tube 53 presents two diametrically opposed lines of longitudinal assembly. The mechanical apparatus for carrying out this method is obviously much less bulky than that described above by reason of the fact that the symmetrical strips are incurved so as to be brought into a semi-cylindrical shape, which is provided over a substantially smaller length than in the case of the rolling of a single strip for obtaining a completely closed cylinder.

The fourth method, illustrated diagrammatically in Fig. 21, consists in winding the strip 51 passing off a roll 52 along a helical line defining the tubular part to be obtained and which corresponds to its own breadth, taking into account the diameter of said tubular part. To this end, the sheet is carried along into rotation around the geometrical axis of the tubular part by a rotary plate 60 to which is fitted an adjustable support 61 carrying the bearings for the roll 52. The edges of the strip are wound helically as in the case of Figs. 19 and 20 through the agency of a roller or wheel 57 cooperating with an inner bearing member 55, which latter is however rigid with the shaft 62 of the plate 60 and rotates with the latter. This last method includes the use of mechanical arrangements which are of a more complex structure than in the preceding cases, but, in contradistinction, it presents the advantage of allowing the execution of systems of various diameters while resorting to only a limited number of breadths of standard strip. It is sufficient as a matter of fact to modify the pitch of the assembling helix as a function of the diameter of the tubular system to be formed, so as to allow the use of all the strip breadths available. Such a method cuts out therefore in practice the waste and losses of material.

In the different methods described, the assembly between the edges of the strip or strips in the case of Fig. 20 may be obtained in any known suitable manner through any means adapted to produce said assembly in a normal manner according to the nature of the material forming the strip such as gluing, sewing, stapling, welding, etc.

The transformation of the cylindrical tubular system obtained by either of the above methods into a tubular prism having a star-shaped cross-section retaining obviously the peripheral length of the cylindrical system does not meet with any substantial practical difficulty. It is sufficient, as a matter of fact, to act on the outside of the tubular wall along generating lines of the latter through as many rotary rollers arranged in radial planes forming with one another equal angles, as the star-shaped prism is to finally include arms, provided that a sprocket wheel or spider including the same number of ridges is housed axially inside said tubular wall so as to ensure the maintenance of the shapes and the tensioning of the sides of the prism.

Figs. 22 and 23 show diagrammatically in elevational and in plan view a mechanical embodiment of such an arrangement designed for the continuous formation of a tubular prism, the cross-section of which is a star with three arms, such as that illustrated in Figs. 16 and 17. The three shaping rollers arranged in star formation are shown at 63a, 63b, 63c and the tubular system 53 is shifted axially between said rollers in the direction of the arrow F. These rollers are driven into rotation round the corresponding axes in the direction of the arrows f by a rotary driving plate 64 provided with a central opening 64a through which the tubular system 53 passes, said driving plate being provided with spiral teeth meshing with cooperating teeth at the periphery of said rollers. At 53a, at the upper end of Fig. 22, the tubular system is still cylindrical. At 53b, at the output end of the plate 64, it is in the shape of a star because the three rollers 63a, 63b and 63c have gradually stretched the concave folds formed by them on the tubular system along the three ridges of a spider 65 suspended axially inside said tubular system.

The very small differences in length existing between the concave folds and the convex folds of the intermediate tubular section during its transformation, between the original circular cross-section and the finished star-shaped cross-section, are absorbed without any difficulty at the very output end of the rollers where the edges of the prism are no longer convergent as provided by a slight curving of the folds which curving is obtained automatically and should not be prevented.

Figures 24, 25:
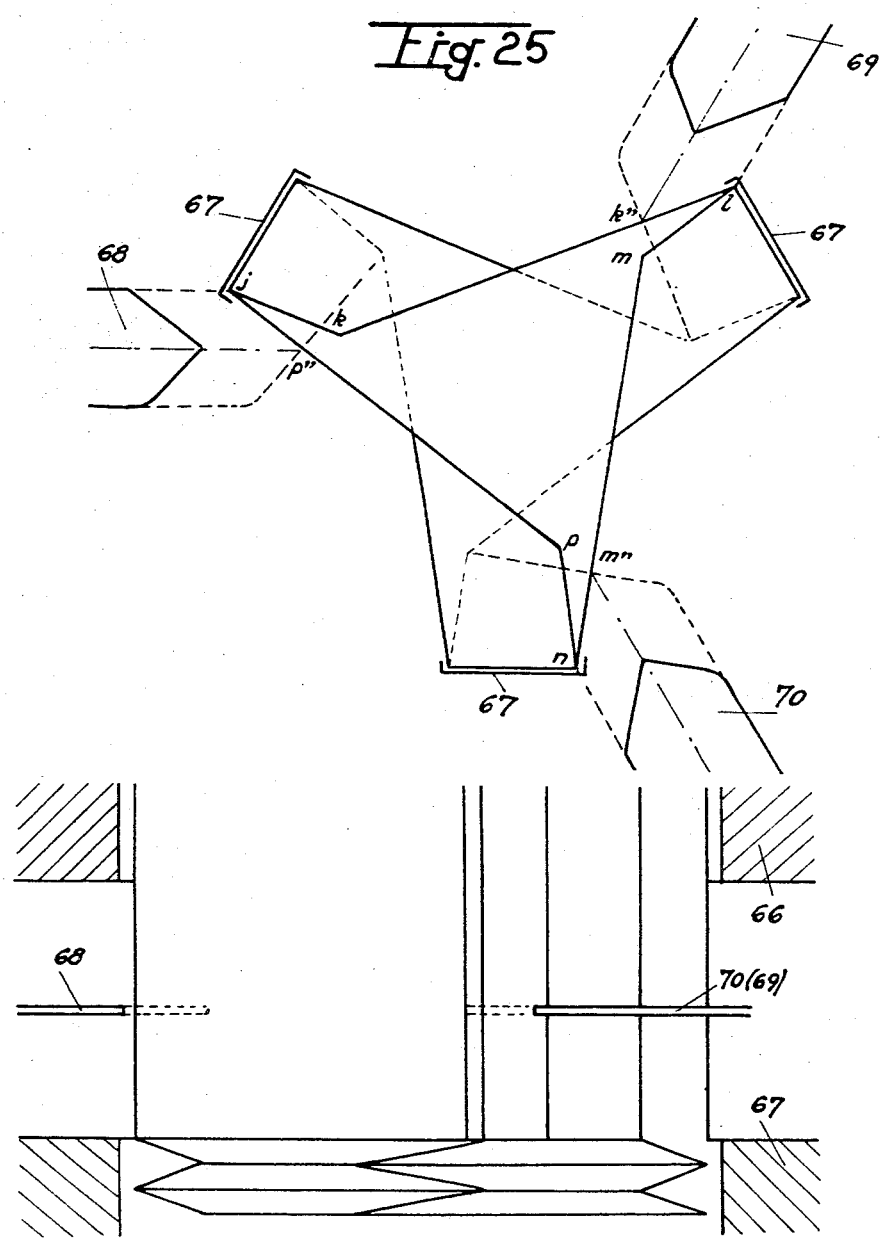

The herring-bone formation of the star-shaped prism obtained in complete conformity with the geometrical showing of Figs. 16 and 17 may lastly be obtained mechanically as follows (Figs. 24 to 29). Under the cooperating action of the arrangement forming the cylindrical tubular system and of the rollers forming the star-shaped tubular prism, the latter progresses in a continuous manner while remaining rigid, at a well-defined speed. The prism enters first, as illustrated in Figs. 24 and 25 a first star-shaped die 66 in which it assumes an asymmetrical shape j—k—l—m—n—p similar to that described with reference to Fig. 17 and differing but very little from the symmetrical shape imparted to it by the rollers. A second die 67 located at a distance equal to twice the height of the transverse folds from the lower surface of the die 56 has its outline defined so as to receive with a certain diametrical clamping the folds of the annular herring-bone structure as it is being produced.

Between the two dies, and at equal distances from their surfaces facing each other, are arranged three folding blades 68, 69, 70 having a suitable angular outline, said blades being rigidly secured together in star formation, on a stationary carrier of which one embodiment will be described hereinafter with all the movable means required for controlling their different movements.

In Figs. 24 and 25, the blades 68, 69 and 70 are illustrated in solid lines in the released position occupied by them at the moment at which a herring-bone forming cycle begins and in dotted lines in the position occupied by them when they have progressed radially and have engaged the three sides of the prism over the lengths j—p", l—k" and n—m". At the same moment of the cycle, the three blades have released the folds of the herring-bone structure formed during the preceding cycle so as to allow said folds to close axially without any obstruction.

Figure 26:
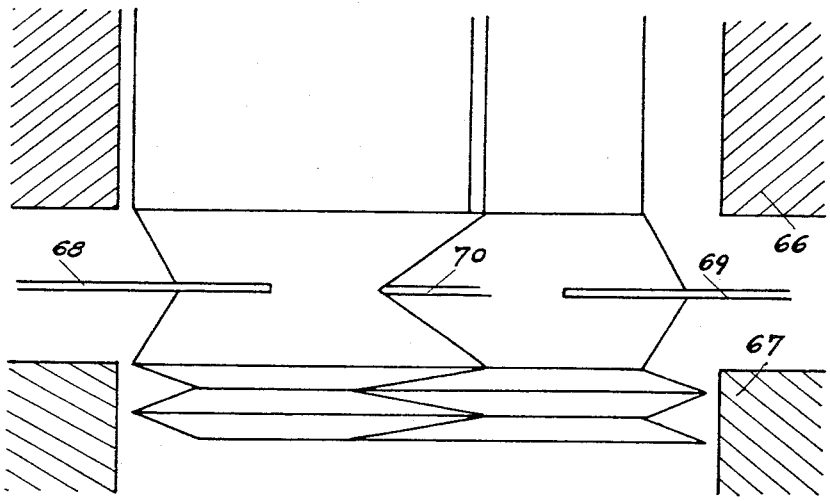
Figure 27:
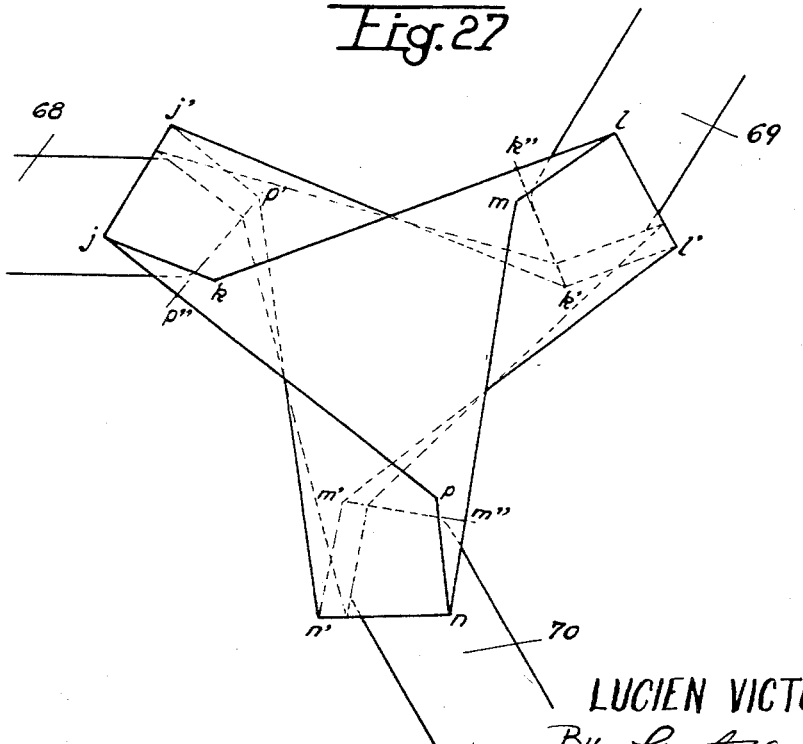

Figs. 26 and 27 show the respective positions of the above-described elements, when the three blades 68, 69, 70 have shifted transversely the sections of the sides j—p", l—k", and n—m", far enough towards the sides j'—p', l'—k' and n'—m', for the clear marking of the folds obtained. At about the same time, the two dies 66 and 67 have moved symmetrically towards the blades by amounts proportional to the axial shiftings of the transverse folds in the making, so that they register accurately with the corresponding portions of the tubular prism.

Figure 28:
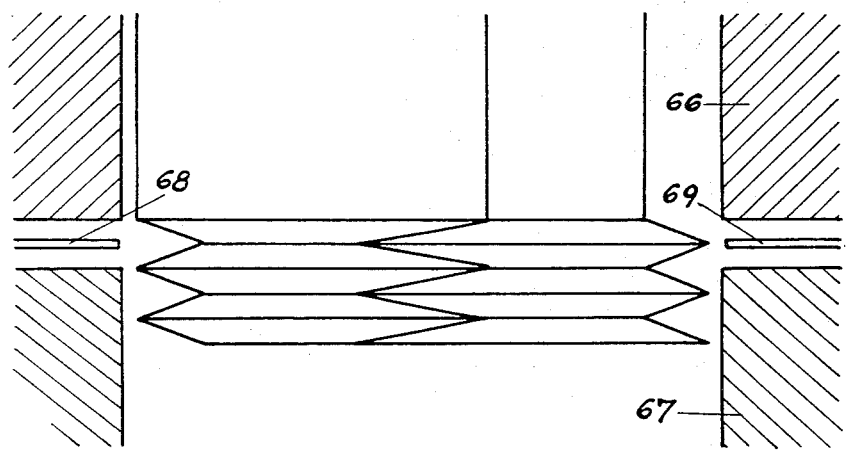
Figure 29:
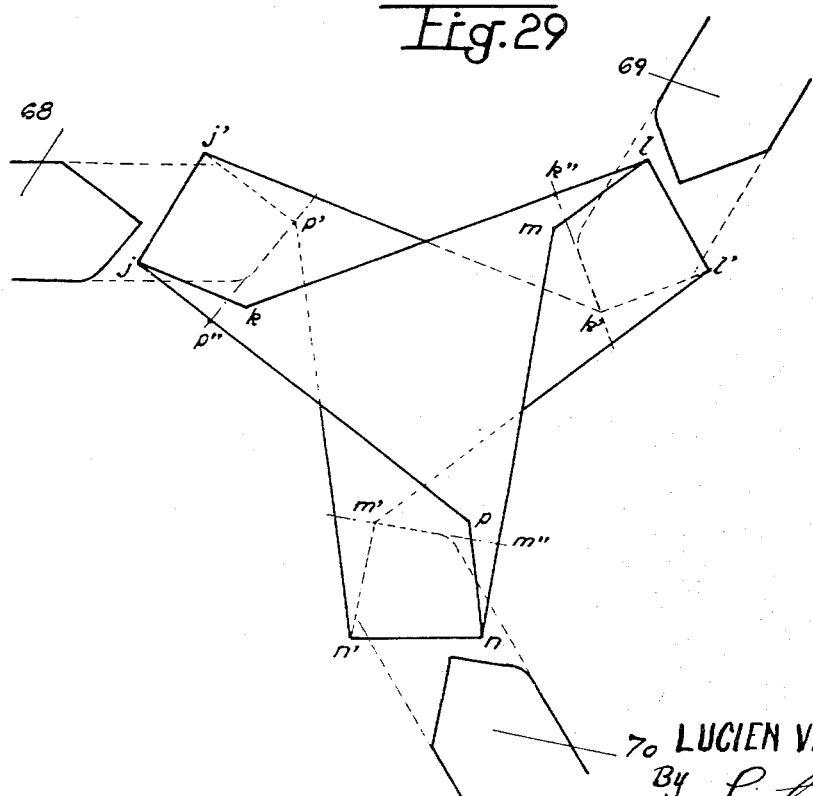

Figs. 28 and 29 illustrate the corresponding positions of the different parts at the end of the herring-bone forming cycle. The blades 68, 69 and 70 are completely released with reference to the folds and the surfaces of the dies 66, 67, facing each other, are then in their position nearest the blades and do not ever move any nearer the latter. The cycle is finished and may begin over again as soon as the dies and blades have returned into their positions illustrated in Figs. 24 and 25. In the meantime and under the thrust of the prism, the two last folds are more marked and have entered a position inside the die 67.

Figs. 30 and 31 illustrate respectively in vertical axial half-sectional view and in half-elevational view the main parts of a machine constructed for the continuous formation, in accordance with the operative cycle which has just been described, of an annular herring-bone structure including twenty-two peripheral arms.

In said embodiment, the die 66 intended to receive the initial star-shaped tubular prism is fixedly attached to a plate 71 while the die 67 adapted to receive the finished herring-bone structure is fixedly attached to another plate 72. The twenty-two folding blades such as 73 are distributed uniformly round the central axis of the system over a stationary circular plate 74 secured to a frame 75. Each of the blades 73 is provided with two longitudinal grooves 73a, 73b engaged respectively by guiding screws 76, 77 securing the blades 73, with suitable spacings between them, to the two rings 78 and 79 which are angularly movable over and are carried by the stationary plate 74. Each blade 73 is furthermore provided with a tenon 80 engaging one of the twenty-two spiral-shaped grooves 81 formed on a third movable ring 82 carried by the plate 74 coaxially between the first rings 78 and 79.

It will be readily ascertained that through this arrangement, it is possible with a suitable combination of rotary movements imparted simultaneously or otherwise to the three rings 78, 79 and 82 on the plate 74 to make the blades 73 describe identical movements of a varying nature corresponding to the forward and rearward movements and to the lateral shifting required for the production of the above-described herring-bone forming cycle. As a matter of fact, the angular movements of a very reduced amplitude of the three rings may be defined through the action of three connecting rods pivotally secured thereto and subjected in their turn to the thrust exerted by three cams of suitable outlines rotating in unison with a common driving shaft. A diagrammatic embodiment of this mechanical arrangement which is not illustrated in Figs. 30 and 31 will be described hereinafter.

On the other hand, the dies 66 and 67 are driven axially towards each other and then shifted apart through the operation of a fourth ring 83 which is angularly shiftable over the plate 74 and carries for instance six peripheral slopes or cam surfaces distributed over its periphery so as to form two identical series arranged pairwise in alternation, said slopes acting respectively on the die-carrying plates 71 and 72 through two series of three rollers such as 84 and 85 (Figs. 32 and 33) fitted in traction rods 86 and 87 connected with said plates. Return springs 88 and 89 provide respectively for the engagement between the rollers 84 and 85 and the slopes on the ring 83 corresponding thereto together with their return movements. The ring 83 is driven into rotation in the same manner as the rings 78, 79 and 82 through a connecting rod subjected to the action of a fourth cam mounted to this end on the same driving shaft as the cams controlling the three other rings.

The arrangement forming a herring-bone structure with twenty-two arms as described hereinabove, operates exactly in conformity with the above disclosed cycle. Under the action of the corresponding control cams describing one revolution per cycle, the rings carried by the plate 74 produce in practice the desired movements, corresponding to said cycle, of the two dies 66 and 67 and the twenty-two blades 73.

Fig. 34 is a general diagrammatic view on a reduced scale of a complete annular herring-bone forming machine comprising means forming the original cylindrical tubular system, means for transforming said system into a star-shaped tubular prism and means for producing the actual herring-bone structure, said means being distributed vertically between two stories of a same building.

On the upper story is located the arrangement forming the tubular cylindrical element which is, in the present case, of the type illustrated in Fig. 21. On the floor 90 is arranged the stationary platform 91 over which runs the circular rotary plate 60 carrying the bearings for the roller 52 off which the strip 51 adapted to form the tubular system is unwound, the plate 60 being centrally carried by an annular bearing 92 fixedly attached to the platform 91 and arranged in registry with an opening 90a passsing through the floor 90.

The plate 60 receives a rotary movement at a suitably reduced speed from a driving shaft 93 carried by the underlying floor through the agency of a transmission 94 actuating a worm 95 meshing with teeth 60a provided at the periphery of said plate. At a suitable distance above the roller 52 is mounted a freely revoluble transmission cylinder 96 which is also carried by the rotary plate 60 through suitable means which are not illustrated, said cylinder being adapted to return the strip 51 towards the axial area of the arrangement in which the said strip is being unwound helically. The latter is driven at the accurate speed required by a feed cylinder 97 angularly set in conformity with the pitch of the winding helix, said cylinder being rotated through a rotary swivel joint 98 meshing with a central stationary pinion 99, the spindle carrying which is secured to the ceiling 100. The cylinders 96 and 97 are of course adapted to be angularly adjusted. A spider 65 of the type described with reference to Figs. 22 and 23, which is held fast by a rod 101 along the axis of the arrangement cooperates in the formation of the tubular system in the upper part of the apparatus and in its lower section in the formation of the star-shaped prism. The helical assembly of the edges of the strip is operated at 57 in a continuous manner through any of the above disclosed means, gluing, sewing, clamping, welding and the like.

The tubular system which is being formed sinks gradually without rotating under the action of its own weight while it slides over the ridges of the spider 35, and it passes finally through the platform 91 and the opening 90a in the floor. On the lower story, said system is transformed into a star-shaped prism under the action of the means described with reference to Figs. 22 and 23 and including rollers 63 driven by the driving plate 64. The latter is driven in its turn at a suitably reduced speed by the driving shaft 93 through the agency of a transmission 102 acting on a worm 103 meshing with teeth provided at the periphery of the plate 64.

Under the plate 64, the star-shaped prism engages the herring-bone forming means which include, as described with reference to Figs. 30 and 31, a plate 71 carrying the star-shaped die, the frame or plate 74 carrying the herring-bone forming blades and the plate 72 carrying the die fed with the finished circular herring-bone structure. At 104 is illustrated diagrammatically one of the links or connecting rods adapted to control the angular shifting of the movable rings carried by the plate 74, said links being actuated by cams such as 105 keyed to a common shaft 106 driven into rotation at a suitably reduced speed by the main driving shaft 93 through the agency of a transmission gear 107 including for instance a worm gear 108.

The annular herring-bone structure passes out of the lower end of the arrangement in the shape of a string 109 which is carried along inside a trough 110 at the end of which it may be cut into sections of a suitable length by a circular rotary blade 111.

As apparent from the above description, the different parts of the assembly are advantageously actuated by the motor driving the rotary plate 60 which allows ensuring perfect proportionality between the herring-bone forming operation and the unwinding of the strip 51. Furthermore, it is of interest to insert immediately ahead of the herring-bone forming means a safety device such as a speed variator adapted to provide for perfect proportionality at any moment between the rotary speed of the shaft 106 carrying the cams of the herring-bone forming means, on the one hand, and the actual penetration of the star-shaped tubular prism into the star-shaped die carried by the plate 71.

Of course, a suitable association of the different apparatus described allows constituting a mechanical device, the general axis of which is arranged horizontally instead of vertically as in the example illustrated in Fig. 34.

Figs. 35 to 39 relate to a modified embodiment of the herring-bone forming means adapted to produce herring-bone structures forming flat sheets.

As illustrated in the diagrammatic view of Fig. 35, said arrangement includes in principle a frame 112 provided with a horizontal bearing surface over which is fitted a lower herring-bone forming grid or grating or ridge array 113. Above the lower grid 113 and in parallelism with the latter is arranged an upper grid 114 slidingly shiftable over the vertical uprights 115 under the action of a hydraulic or the like thrust member 114a, so as to be shifted alternatingly towards and away from the lower grid 113.

Each of the grids includes two lateral girders or longitudinal members 116 shaped so as to form each two parallel slideways 116a, 116b facing each other from one girder or longitudinal member 116 to the other, said slideways serving for the guiding of a number of carrying blades 117 and herring-bone forming blades 118 respectively, said blades being arranged in alternation, this being shown for the lower grid in the diagrammatic plan view of Fig. 36 associated with the detail views of Figs. 37 to 39. The carrier blades 117 and the herring-bone forming blades 118 are provided with similar toothed edges in which the outline of each tooth corresponds to the outline of a fold of the strip to be formed into herring-bone shape after it has been pleated in accordance with one of the methods described hereinafter.

It will be readily understood from the following description that the herring-bone blades 118 play the part of the above described blade-carrying members 11 and 12 as illustrated in Figs. 8 to 15, while their teeth correspond to the prior herring-bone forming blades 9 and 10, and the carrier-blades 117 act after the manner of the dies 7 and 8. Consequently, during the herring-bone forming operation, the carrier-blades 117 of each grid are constrained to move towards each other through a translational movement in parallelism with their own planes, while the herring-bone forming blades 118 arranged between them in a median position are constrained to move transversely so as to form the folds in the herring-bone structure through application of the technique illustrated hereinabove with reference to Figs. 8 to 13. To this end, the blades 117 and 118 forming each of the grids or arrays are interconnected in succession, as shown in Figs. 37 to 39 by a chain formed by double links 119, the number of which corresponds to the number of blades and the pivotal axes 120 of which are attached alternatingly to a blade 117 and to a blade 118 by straps 121 and 122 welded respectively to the ends of said blades. On the other hand, the slideways 116b for the girders or longitudinal members 116 inside which are guided the herring-bone forming blades 118, are provided beyond the position occupied by the grid in its starting inoperative condition with oblique sections 116c forming slopes extending on each slideway between the points r1 and r2 and merging into parts 116d parallel with the general direction of the slideway 116b (Figs. 36 and 37). Under such conditions, when the grid system is urged in the direction of the arrow F (Fig. 36) which may be executed through the agency of a piston which is not illustrated, the carrier blades 117 move in parallelism with their own plane in the slideways 116a (Fig. 38) while the herring-bone forming blades 118 are subjected, as they move over the slopes 116c, between r1 and r2, to a transverse shifting which corresponds, through the agency of the connecting links 119, to an oblique movement resulting in a movement of the blades 117 towards the blades 118. When all the blades illustrated in Fig. 36 as occupying the space extending between the front end of the girders 116 and the points r1 have moved beyond the slopes 116c, they occupy the restricted spaces extending between the points r2 and the rear ends of the girders 116.

Taking into account the preceding explanations, the herring-bones are formed as follows: there is positioned over the lower grid 113 located in the position illustrated in Fig. 36, an element of a pleated strip (Fig. 40) which presents uniform folds the outlines of which correspond to those of the teeth of the blades 117 and 118 over which said folds are fitted, as apparent from Fig. 38, where the pleated strip element is illustrated cross-sectionally by a thick line 123. The upper grid 114 is then lowered through action on the thrust member 114a (Fig. 35) so that the teeth of the blades 117 and 118 of said grid engage in their turn the folds of the strip element 124 until said folds are held fast between the two grids (Fig. 38), after which the system constituted by the two grids is shifted inside the corresponding slideways through the agency of the piston provided to this end and which is not illustrated. After passing over the slopes 116c, the herring-bone forming blades are shifted laterally in accordance with the preceding procedure, and occupy the position illustrated in Fig. 39 while they are brought nearer the carrier blades 117, so as to form the successive troughs or folds of the herring-bone structure in the folds of the strip element 123. When all the blades have moved past the slopes 116c, and are brought into closer relationship inside the space extending between the points r2 and the rear ends of the girders 116, the formation of the herring-bone structure is finished and the strip element 123 assumes the appearance illustrated in plan view in Fig. 41. In order to release the herring-bone structure, it is sufficient to raise the upper grid 114 into the position illustrated in Fig. 35.

Figs. 42 to 46 illustrate an arrangement for the transverse pleating adapted to serve in association with a herring-bone forming mechanism of the type illustrated hereinabove so as to constitute a complete herring-bone forming machine for the simultaneous execution of transverse herring-bone troughs or folds in a plurality of superposed sheets fed in strips of an indefinite length.

In the example considered, the arrangement includes (Figs. 42 and 43) five strip-carrying rollers 124a, 124b, 124c, 124d, 124e carried in parallelism in supports 125a, 125b, 125c, 125d, 125e mounted on a common pedestal 126, on which supports the strip-carrying rollers revolve freely. The strips 127a, 127b, 127c, 127d, 127e unwound off said rollers under the tractional action of two pairs of pleating cylinders 128, 129 described hereinafter in detail, pass over transmission rolls 130a, 130b ... 130e having their axes located in a common horizontal plane so that the strips are superposed and pass together between two presser rolls 131, 132 urging them energetically against one another before they are admitted between the pleating cylinders.

The pleating cylinders 128, 129 carry at their periphery, as clearly apparent from examination of Fig. 46, rolls 133 which are uniformly spaced and have their axes parallel with the axes of the cylinders; said rolls are adapted to form the transverse folds by engaging sufficient amounts of material in the superposed strips as the latter pass over them. The pleated system passing out of the cylinders 128, 129 enters a collecting box 134 inside which it urges a pneumatic piston 135 forwardly and acts after the manner of a spring (Fig. 44). The collecting box 134 and the piston 135 are fitted on a plate secured elastically to a frame 137 carrying also the pleating cylinders 128, 129. Between the two parts forming each of the pleating cylinders 128, 129 is provided a free space inside which is fitted an extension 134a of the collecting box 134 (Fig. 45), said extension being adapted to take hold of the folds as soon as they are formed, so as to prevent them from being driven into rotation by any of the rolls 133.

Underneath the collecting box 134 is located a cutting blade 138 adapted to be lowered inside said box through a slot 134b provided in the latter so as to cut the pleated system when the collecting box contains a sufficient number of folds. As soon as said cut has been performed, an ejecting piston 139 provided on one side of the collecting box pushes laterally the folded element which assumes at the end of its stroke the position 140 illustrated in dot-and-dash lines in Fig. 45.

When the piston 139 returns into its starting position, the blade 138 releases the box 134; at this moment the compressing piston 135 returns into engagement with the folds which have been formed in the meantime.

It is thus possible to obtain sections of pleated strips with five plies which are positioned in succession by hand or mechanically between the grids 113 and 114 of the precedingly described herring-bone forming mechanism in a manner such that their folds engage the teeth of the blades forming said grids. After the formation of the herring-bone is at an end, the five ply herring-bone structure is removed and the grids 113 and 114 are returned into their original position, the herring-bone forming means are ready to receive the further five-ply pleated section which, at the end of the same period, has been ejected out of the pleating machine. A workman may thus carry out manually with a high yield the production of herring-bone structures inside which the large folds or troughs of herring-bone sides are arranged transversely with reference to the longitudinal direction of the original strips.

Figs. 47a, 47b, 48a, 48b, 49 and 50 relate to a machine designed for the continuous formation of herring-bones, without any manual operation, in strips of an indefinite length, by forming in the latter longitudinal folds or troughs of herring-bone sides; although a single strip has been illustrated in said figures, the machine shown in said figures may as well provide for the simultaneous herring-bone deformation of a plurality of superposed strips.

In said embodiment, the machine includes a roller 141 mounted in a support 142 and off which unwinds the strip of material 143 to be transformed into a herring-bone structure. After passing underneath a transmission roller 144 and over a horizontal rule 145 having a suitably incurred front outline, the strip 143 is engaged between two series of endless belts 146, 147 held in position by terminal rollers 148 and 149 and by intermediate rollers 150a, 150b, 150c mounted on a carrier 151 secured to the frame 152, said belts being such that they converge in the direction leading from the rollers 148 towards the rollers 149 as apparent from inspection of Figs. 48a and 48b. In a preferred embodiment, the belts 146, 147 may be constituted by steel wire springs made of joining convolutions guided in peripheral grooves of the intermediate rollers 150a, 150b and of the terminal rollers 148, 149 as illustrated in Fig. 50 which is a partial cross-section on a larger scale.

When reaching the vicinity of the terminal rollers 149, the strip 143 is pleated longitudinally but in an irregular manner because the convergent folds cannot be transformed automatically into parallel folds in an orderly manner. At the output end of the belts 146, 147 is arranged a transverse die 153 carrying small springs 154a, 154b directed alternatingly upwardly and downwardly and engaging the folds of the strip 143 so as to provide a perfect positioning of the latter. After passing over the springs 154a, 154b, the pleated strip is engaged between the grids 113 and 114 of a herring-bone forming device of the type described with reference to Figs. 35 to 39. Fig. 48b shows in plan view the blades 117, 118 of one of the grids and the girders 116 inside which said blades are guided in association with their slopes 116c. The girders 116 are in their turn guided in the slideways 155 as seen endwise in Fig. 15, while double acting pistons 156, 157 (Fig. 47b) allow shifting inside said slideways alternatingly in both directions said girders 116 forming framing members.

The herring-bone forming cycle is then executed in the following manner:

The two grids 113 and 114 being urged towards each other (Figs. 47a and 47b) engage the folds of the strip 143 between the teeth of the corresponding blades and then the framing members formed by the girders 116 are urged in the direction of the arrow F1 (Fig. 48b) by the pistons 156, 157. The blades 117, 118 are subjected in succession to the action of the cam surfaces or slopes 116c and produce in succession the waves of herring-bones in the pleated strip 143. At the end of the stroke of the pistons 156, 157, i.e. when all the blades 117, 118 have passed over the slopes 116c, the formation of the herring-bone is at an end. At this moment, the pistons acting in the opposite direction return the girders 116 into their starting position. All the blades 117, 118 return therefore also into their starting position and draw behind them a length of pleated strip equal to the length covered by them. The grids 113, 114 move then apart and the blades move in the opposite direction away from one another, so as to reach their maximum spacing. For said position of the grids, the two grids are again shifted towards each other and the cycle of operations begins over again as described.

The machine thus designed operates continuously since it supplies itself the herring-bone forming means with the strip which is pleated under the action of the traction exerted between the belt sheets 146, 147 and feeds the herring-bone strip in an uninterrupted manner at the output end of the herring-bone forming means.

What I claim is:

1. An apparatus for the continuous mechanical execution of developable herring bone structures starting from a strip of foldable material of an indefinite length, characterized by the fact that it includes means for forming in the original strip of material straight longitudinal parallel folds arranged in suitable alternation and for imparting to the pleated strip a continuous translational movement in the direction of its length, a set of blades arranged transversely with reference to the direction of the translational movement of the pleated strip so as to form in the latter transverse folds corresponding to the actual formation of the herring-bone, two movable dies arranged symmetrically on either side of the above-mentioned set of blades at a distance from each other which corresponds at the start to the length of the section of the pleated strip which is required for the formation of a row of transverse folds of the herring-bone structure, one of said dies having an inner outline corresponding to the transverse outline of the longitudinally pleated sheet and being engaged by the latter before said sheet is formed into a herring-bone structure while the second die has an inner outline corresponding to the transverse outline of the finished herring-bone structure and serves for the final passage of the latter, and lastly means for imparting to a set of blades transverse translational movements adapted to produce the herring-bone structure and to impart to the two dies in synchronism with the movements of the blades reciprocatory translational movements longitudinaly of the pleated strip with a view to bringing said dies during the formation of a row of transverse folds from their original position into the immediate vicinity of the blades and to returning them subsequently into their starting position while the pleated strip continues executing its translational movement so as to bring a following section of the pleated strip into a position in which it is shaped into a herring-bone structure.

2. An apparatus as claimed in claim 1, adapted to provide for the execution of flat sheets of herring-bone structures wherein the means forming in the original strip alternating rectilinear folds include a number of pairs of rollers constituted by juxtaposed frusto-conical rolls, the conicity of which increases gradually from one pair of rollers to the next while their axial length decreases so as to produce folds which are gradually deeper and closer.

3. An arrangement for the execution of flat sheets of herring-bone structures as claimed in claim 1, wherein the blades adapted to form the folds of the actual herring-bone structure include two series of blades arranged to either side of the longitudinally pleated strip and of which the operative edges slope along the angles to be provided in the herrnig-bone structure, said two series of blades being secured respectively to two blade-carriers, which are guided on the frame carrying them by oblique slideways which allow them to receive reciprocatory translational movements of a corresponding obliquity with reference to the longitudinally pleated strip.

4. An apparatus as claimed in claim 1, adapted to produce tubular herring-bone structures including means adapted to ensure the preliminary formation, starting from the strip of material of an indefinite length, of a cylindrical tubular system of an also indefinite length.

5. An apparatus as claimed in claim 1 adapted to produce flat sheets of herring-bone structures, wherein the mechanism providing for the formation of the actual herring-bone structure in the previously pleated initial strip includes a multiplicity of arrangements adapted to produce each a single wave of herring-bones, each of said arrangements including two series of herring-bone forming blades rigid with two blade-carriers assuming reciprocating translational movements of a suitable obliquity with reference to the pleated strip and located to either side of the latter between the two movable dies adapted to be alternatingly moved symmetrically towards and away from said blades, said arrangements being mounted in parallelism with each other and transversely with reference to the folds of the pleated strip and being designed in a manner such that they may be actuated in sequence and form successive waves of herring-bones on the same pleated strip during a single thrust of the herring-bone forming means.

6. An apparatus as claimed in claim 5, wherein the mechanism forming the herring-bone structure is constituted by two superposed grids adapted to be alternatingly shifted towards and away from each other for engaging and releasing respectively the folds of the pleated strip, each of said grids including a multiplicity of alternating parallel blades acting respectively as dies and as carriers for the herring-bone forming blades, each of these different blades being provided with a series of teeth the outlines of which correspond to the outline of a fold of the pleated strip, said blades being guided at their ends inside said slideways in which they are adapted to be shifted reciprocatingly in parallelism with their own planes and being interconnected in each grid by pivoting members so that their translational movements in said slideways may produce alternatingly their closing and their spacing and correspondingly the successive lateral shiftings of the different carriers of the herring-bone forming blades by an amount corresponding to the amplitude of a herring-bone forming wave.

7. An apparatus for executing flat sheets of herring-bone structures as claimed in claim 1 wherein the means for executing the longitudinal pleating of the original strip include two series of endless belts constituted each by a number of endless belts corresponding to the number of folds to be formed in the strip and which are carried by corresponding rolls so as to form two interengaging sheets converging gradually in the direction of the longitudinal movement of the strip and between which the latter is constrained to pass while means are provided at the outlet of said sheets of belts for uniformizing the folds formed in the strip.

8. An apparatus for executing flat sheets of herring-bone structures as claimed in claim 1, wherein the means adapted to form in the original strip rectilinear longitudinal folds serve for the simultaneous pleating of a plurality of superposed strips unwinding off a corresponding number of rollers arranged for ensuring a correct guiding and superposition of said strips before they pass through the pleating means.

9. An apparatus for the execution of flat sheets of herring-bone structures as claimed in claim 1, wherein the blades adapted to form the folds of the actual herring-bone structure include two series of blades arranged to either side of the longitudinally pleated strip and of which the operative edges slope along the angles to be provided in the herring-bone structure, two blade-carriers, a plurality of dies, said two series of blades being secured respectively to said two blade-carriers, a movable frame, a mechanism including a link, which blade-carriers are guided on the frame carrying them by oblique slideways which allow them to receive reciprocatory translational movements of a corresponding obliquity with reference to the longitudinally pleated strip, the said blade-carriers and the said dies being carried by said movable frame assuming a sinusoidal movement imparted to it by said mechanism including a link, an eccentric executing one revolution per cycle corresponding to the formation of a row of herring-bone folds, one end of which link is revolubly carried by said eccentric.

10. An apparatus for the execution of flat sheets of herring-bone structures as claimed in claim 1, to form a longitudinally pleated strip, wherein the blades adapted to form the folds of the actual herring-bone structure include two series of blades arranged to either side of the longitudinally pleated strip and of which the operative edges slope along the angles to be provided in the herring-bone structure, a pair of blade-carriers, a movable frame, said two series of blades being secured respectively to said two blade-carriers, oblique slideways, a plurality of movable dies, pairs of levers, a plurality of transmissions, a common driving shaft, rotary cams carried on said shaft, an eccentric member carried on said shaft, which blade-carriers are guided on the frame carrying them by said oblique slideways which allow them to receive reciprocatory translational movements of a corresponding obliquity with reference to the longitudinally pleated strip, and wherein the reciprocatory movements of said dies and of said blade-carriers with reference to said frame carrying them are controlled respectively by said pairs of levers, arrange symmetrically and subjected, through the agency of suitable transmissions, to angular movements of a suitable amplitude under the action of rotary cams keyed to a common driving shaft carrying also the eccentric member controlling said frame.

11. An apparatus as claimed in claim 1, adapted to produce tubular herring-bone structures having a plurality of radial arms, including means adapted to ensure the preliminary formation, starting from a strip of material of an indefinite length, of a cylindrical tubular system of an also indefinite length, and means for transforming the tubular cylindrical system into a prism of star-shaped cross-section including as many radial arms as the herring-bone structure to be obtained.

12. An apparatus as claimed in claim 1, adapted to produce tubular herring-bone structures having a plurality of radial arms, including means adapted to ensure the preliminary formation, starting from a strip of material of an indefinite length, of a cylindrical tubular system of an also indefinite length, and means for transforming the tubular cylindrical system into a prism of a star-shaped cross-section including as many radial arms as the herring-bone structure to be obtained, said latter mentioned means including a series of rotary rollers arranged along generating lines of the system of tubular herring-bone structures in radial planes forming with each other equal angles, the number of which rollers is equal to the number of radial arms of the star-shaped prism to be obtained, a spider arranged axially inside the tubular system and provided with a corresponding number of longitudinal ridges, said rollers co-operating with said spider.

13. An apparatus as claimed in claim 1, adapted to produce tubular herring-bone structures having a plurality of radial arms, including means adapted to ensure the preliminary formation, starting from a strip of material of an indefinite length, of a cylindrical tubular system of an also indefinite length, and means for transforming the tubular cylindrical system into a prism of a star-shaped cross-section including as many radial arms as the herring-bone structure to be obtained, a plurality of blades, a stationary circular plate, three angularly movable rings, and wherein said blades adapted to form the actual herring-bone folds, the number of which corresponds to the number of arms of the herring-bone structure to be obtained, are mounted radially on said stationary circular plate, each blade being provided with two longitudinal grooves which guide them over two of said angularly movable rings mounted coaxially with the stationary plate and being furthermore provided with a tenon engaging a spiral-shaped groove in a third movable ring mounted coaxially with the two other rings on said stationary plate, whereby suitable angular movements imparted to said three rings constrain the system of blades to execute the same forward and rearward movements and lateral movements cooperating therewith for the formation of the herring-bone structure.

14. An apparatus as claimed in claim 1, adapted to produce tubular herring-bone structures having radial arms, including means adapted to ensure the preliminary formation, starting from a strip of material of an indefinite length, of a cylindrical tubular system of an also indefinite length, and means for transforming the tubular cylindrical system into a prism of a star-shaped cross-section including as many radial arms as the herring-bone structure to be obtained, a plurality of blades, a stationary circular plate, a plurality of die plates, a plurality of dies carried on said die plates, and wherein the blades adapted to form the actual herring-bone folds, the number of which corresponds to the number of arms of the herring-bone structure to be obtained, are mounted radially on a stationary circular plate, said die plates being arranged to either side of the blade-carrying circular plate coaxially therewith and assume symmetrical movements towards and away from said circular plate.

15. An apparatus as claimed in claim 1, adapted to produce tubular herring-bone structures having radial arms, including means adapted to provide for preliminary formation, starting from the strip of material of an indefinite length, of a cylindrical tubular system of an also indefinite length, and means for transforming the tubular cylindrical system into a prism of a star-shaped cross-section including as many radial arms as the herring-bone structure to be obtained, a plurality of blades, a stationary circular plate, four angularly movable rings, a plurality of die plates, a plurality of dies carried on said die plates, and wherein the blades adapted to form the actual herring-bone folds, the number of which corresponds to the number of arms of the herring-bone structure to be obtained, are mounted radially on said stationary circular plate, each blade being provided with two longitudinal grooves which guide them over two of said angularly movable rings mounted coaxially with said stationary plate and being, furthermore, provided with a tenon engaging a spiral-shaped groove in a third said movable ring mounted coaxially with the two other said rings on said stationary plate, whereby suitable angular movements imparted to said three rings constrain the system of blades to execute the same forward and rearward movements and lateral movements cooperating therewith for the formation of the herring-bone structure, and said dies are carried by said die plates arranged to either side of the blade-carrying circular plate coaxially therewith and assume symmetrical movements towards and away from said circular plate; the movement of said die-carrying plates in either direction being controlled by a fourth said angularly movable ring mounted on said blade-carrying circular plate and provided at its periphery with two sets of sloping cam surfaces corresponding respectively to each of said die-carrying plates, a plurality of traction rods, rolls carried on said traction rods, springs urging said traction rods, said cam surfaces acting on said die-carrying plates through the agency of said rolls carried by said traction rods subjected to the action of said springs and connected with each of said die plates.

16. An apparatus as claimed in claim 1, adapted to produce tubular herring-bone structures having radial arms, including means adapted to provide for the preliminary formation, starting from a strip of material of an indefinite length, of a cylindrical tubular system of an also indefinite length, and means for transforming the tubular cylindrical system into a prism of a star-shaped cross-section including as many radial arms as the herring-bone structure to be obtained, a plurality of blades, a stationary circular plate, four angularly movable rings, a plurality of die plates, a plurality of dies carried on said die plates, and wherien the blades adapted to form the actual herring-bone folds, the number of which corresponds to the number of arms of the herring-bone structure to be obtained, are mounted radially on a stationary circular plate, each blade being provided with two longitudinal grooves which guide them over two of said angularly movable rings mounted coaxially with the stationary plate and being, furthermore, provided with a tenon engaging a spiral-shaped groove in a third said movable ring mounted coaxially with the two other said rings on said stationary plate whereby suitable angular movements imparted to said three rings constrain the system of blades to execute the same forward and rearward movements and lateral movements cooperating therewith for the formation of the herring-bone structure, and the dies are carried by die plates arranged to either side of the blade-carrying circular plate coaxially therewith and assume symmetrical movements towards and away from said circular plate; the movement of the die-carrying plates in either direction being controlled by a fourth said angularly movable ring mounted on the blade-carrying circular plate and provided at its periphery with two sets of sloping cam surfaces, corresponding respectively to each of said die-carrying plates, a plurality of traction rods, springs urging said traction rods, a plurality of rolls carried by said traction rods, said cam surfaces acting on said die-carrying plates through the agency of said rolls carried by said traction rods subjected to the action of said return springs and connected with each of said die plates, a plurality of connecting rods, a driving cam shaft, a plurality of cams mounted on said cam shaft, and the angular movements of the said rings controlling the blades and of the said ring controlling the movements of the die-carrying plates being obtained through the agency of said connecting rods associated with the corresponding rings and subjected to the thrust of corresponding said cams of suitable outlines revolving in unison with said common driving cam shaft.

17. An apparatus as claimed in claim 1, adapted to produce flat sheets of herring-bone structure, wherein the mechanism providing for the formation of the actual herring-bone structure in the previously pleated initial strip includes a multiplicity of arrangements adapted to produce each single fold of herring-bones, two movable dies, die carrier means for movably mounting said dies, each of said arrangements including two series of herring-bone forming blades rigid with two blade-carriers which are given reciprocating translational movements of a suitable obliquity with reference to the pleated strip and located to either side of the latter between two movable dies adapted to be alternatingly moved symmetrically towards and away from said blades, said arrangements being mounted in parallel with each other and transversely with reference to the folds of the pleated strip and being designed in a manner such that they may be actuated in sequence and form successive arrays of herring-bone on the same pleated strip during a single thrust of the herring-bone forming means, and wherein means are provided at the output of the pleating means for cutting in said pleated strip sections of a length corresponding to that which can be treated by the actual herring-bone forming means.

References Cited in the file of this patent

UNITED STATES PATENTS

| 778,462 | Sexton | Dec. 27, 1904 |
| 2,625,082 | Wight | Jan. 13, 1953 |
| 2,697,970 | Tipper | Dec. 28, 1954 |
| 2,709,950 | Foster et al. | June 7, 1955 |